(12) United States Patent
Huang

(10) Patent No.: US 11,677,978 B2
(45) Date of Patent: Jun. 13, 2023

(54) OMNIDIRECTIONAL VIDEO PROCESSING METHOD AND DEVICE, RELATED APPARATUSES AND STORAGE MEDIUM

(71) Applicant: ZTE CORPORATION, Guangdong (CN)

(72) Inventor: Cheng Huang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/298,580

(22) PCT Filed: Sep. 6, 2019

(86) PCT No.: PCT/CN2019/104703
§ 371 (c)(1),
(2) Date: May 30, 2021

(87) PCT Pub. No.: WO2020/107998
PCT Pub. Date: Jun. 4, 2020

(65) Prior Publication Data
US 2022/0014786 A1 Jan. 13, 2022

(30) Foreign Application Priority Data
Nov. 30, 2018 (CN) .......................... 201811459740.6

(51) Int. Cl.
*H04N 19/597* (2014.01)
*H04N 13/178* (2018.01)
(Continued)

(52) U.S. Cl.
CPC ......... *H04N 19/597* (2014.11); *H04N 13/161* (2018.05); *H04N 13/178* (2018.05); *H04N 23/635* (2023.01); *H04N 23/69* (2023.01)

(58) Field of Classification Search
None
See application file for complete search history.

(56) References Cited

U.S. PATENT DOCUMENTS 10,880,535 B2 12/2020 Oh et al.
2006/0257032 A1 11/2006 Nakagawa
(Continued)

FOREIGN PATENT DOCUMENTS

CN 1738434 A 2/2006
CN 1759616 A 4/2006
(Continued)

OTHER PUBLICATIONS

Patrice Rondao Alface et al. 16K Cinematic VR Streaming. In Proceedings of the 25th ACM international conference on Multimedia (MM '17). Association for Computing Machinery, New York, Ny, USA, 1105-1112 (Year: 2017).*
(Continued)

*Primary Examiner* — Stefan Gadomski
(74) *Attorney, Agent, or Firm* — Li & Cai Intellectual Property (USA) Office

(57) ABSTRACT

The present application provides a video data processing method and device, a server, a terminal, and a storage medium. The method includes: determining a sphere region of an omnidirectional video, and one or more zoom regions of the sphere region on a projected picture of the omnidirectional video; and decoding and playing video data of the one or more zoom regions of the sphere region on the projected picture of the omnidirectional video, in response to a zoom operation on the sphere region of the omnidirectional video.

19 Claims, 12 Drawing Sheets

(51) Int. Cl.
  *H04N 13/161* (2018.01)
  *H04N 5/232* (2006.01)
  *H04N 23/69* (2023.01)
  *H04N 23/63* (2023.01)

(56) References Cited

U.S. PATENT DOCUMENTS

| | | | |
|---|---|---|---|
| 2016/0381398 A1* | 12/2016 | Saxena | H04N 21/816 348/39 |
| 2018/0082144 A1* | 3/2018 | Wakamatsu | H04N 5/23264 |
| 2018/0199042 A1* | 7/2018 | Wang | H04N 21/816 |
| 2018/0288435 A1 | 10/2018 | Boyce et al. | |
| 2018/0332265 A1* | 11/2018 | Hwang | H04N 21/8451 |
| 2018/0376125 A1* | 12/2018 | Wang | H04N 19/00 |
| 2018/0376152 A1* | 12/2018 | Wang | H04N 19/89 |
| 2019/0020863 A1* | 1/2019 | Wang | H04N 21/234345 |
| 2019/0141359 A1* | 5/2019 | Taquet | H04N 21/2353 |
| 2019/0364204 A1* | 11/2019 | Wozniak | H04N 19/184 |
| 2019/0364205 A1* | 11/2019 | Wozniak | H04N 21/4728 |
| 2020/0169754 A1* | 5/2020 | Wang | H04N 13/371 |
| 2020/0244942 A1* | 7/2020 | Maze | H04N 21/4347 |
| 2020/0322586 A1* | 10/2020 | Lee | H04N 21/8583 |
| 2020/0389640 A1* | 12/2020 | Lee | H04N 13/194 |
| 2021/0409798 A1* | 12/2021 | Maze | H04N 21/23439 |

FOREIGN PATENT DOCUMENTS

| | | |
|---|---|---|
| CN | 107018336 A | 8/2017 |
| CN | 107426491 A | 12/2017 |
| CN | 107852532 A | 3/2018 |
| CN | 108702528 A | 10/2018 |

OTHER PUBLICATIONS

WIPO, International Search Report dated Nov. 11, 2019.
China Patent Office, Second Office Action dated Jul. 5, 2022 for application No. CN201811459740.6.
European Patent Office, Extended European search report dated Aug. 1, 2022 for application No. EP19889045.1.
Cheng Huang et al: "[OMAF] Support of spherical zooming for omnidirectional video", 122. MPEG Meeting, Apr. 18, 2018.
"Omnidirectional media format", 121. MPEG Meeting, Feb. 28, 2018.
Hannuksela (Nokia) M M et al: "[OMAF] How OMAF v1 supports MPEG-I phase 1b requirements", 122. MPEG Meeting, Apr. 6, 2018.
China Patent Office, Third Office Action dated Dec. 5, 2022 for application No. CN201811459740.6.

* cited by examiner

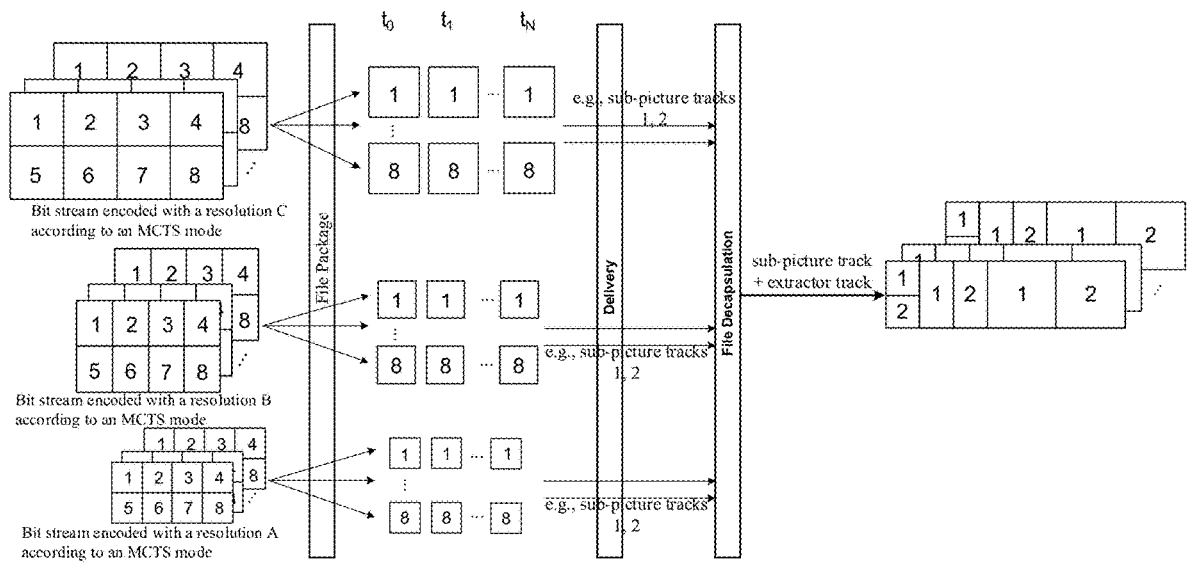

Fig. 14

| Determine, based on the sphere region zooming box or coverage information box in the omnidirectional video track sample entry, a corresponding sphere region of the omnidirectional video, and one or more zoom regions of the sphere region on a projected picture of the omnidirectional video | 1501 |

| decode and play video data of the one or more zoom regions on the projected picture of the omnidirectional video, in response to a zoom operation on the sphere region of the omnidirectional video | 1502 |

Fig. 15

OMNIDIRECTIONAL VIDEO PROCESSING METHOD AND DEVICE, RELATED APPARATUSES AND STORAGE MEDIUM

TECHNICAL FIELD

The present disclosure relates to, but is not limited to, the field of video processing.

BACKGROUND

VR (Virtual Reality) is a technology that simulates and generates a three dimensional (3D) virtual world with computer technologies so that a user can experience a highly realistic virtual space in the aspects of vision, hearing, touch, and the like. With the rapid development of VR technologies, applications of VR videos (also called omnidirectional videos) such as on-demand and live broadcasts are more and more extensive, and immersive video service and experience are brought to users.

Currently, on one hand, an omnidirectional video needs to provide a panoramic viewing experience in both a horizontal direction (in a range of 360 degrees) and a vertical direction (in a range of 180 degrees), so the video quality per unit area or resolution (number of pixels per degree) of the omnidirectional video is much lower than that of a single-view video (such as a traditional TV video) under the same bitrate condition; on the other hand, limited by bandwidth conditions of the current network infrastructure, the video bitrate of the omnidirectional video provided by the service providers in the market is often limited, and these factors finally result in that the image quality of a region of interest for the user is generally not high while the omnidirectional video is played, which greatly affects the experience of the omnidirectional video service.

In view of the above problems in the existing art, no effective solution has been found yet.

SUMMARY

In an embodiment of the present disclosure, there is provided a video data processing method and device, related apparatuses and a storage medium.

In an embodiment of the present disclosure, there is provided a video data processing method applied to a server, the method including: determining a sphere region of an omnidirectional video, encoding and generating video data of a projection region of the sphere region on a projected picture of the omnidirectional video, and video data of one or more zoom regions of the sphere region on the projected picture of the omnidirectional video; and storing the encoded video data, information on the sphere region of the omnidirectional video, and information on the one or more zoom regions of the sphere region on the projected picture of the omnidirectional video.

In an embodiment of the present disclosure, there is further provided a video data processing method applied to a server, the method including: determining a 2D region on a projected picture of an omnidirectional video, encoding and generating video data of the 2D region, and video data of one or more zoom regions of the 2D region on the projected picture of the omnidirectional video; and storing the encoded video data, information on the 2D region on the projected picture of the omnidirectional video, and information on the one or more zoom regions of the 2D region on the projected picture of the omnidirectional video.

In an embodiment of the present disclosure, there is further provided a video data processing method applied to a terminal, the method including: determining a sphere region of an omnidirectional video, and one or more zoom regions of the sphere region on a projected picture of the omnidirectional video; and decoding and playing video data of the one or more zoom regions of the sphere region on the projected picture of the omnidirectional video, in response to a zoom operation on the sphere region of the omnidirectional video.

In an embodiment of the present disclosure, there is further provided a video data processing method applied to a terminal, the method including: determine a 2D region on a projected picture of an omnidirectional video, and one or more zoom regions of the 2D region on the projected picture of the omnidirectional video; and decoding and playing video data of the one or more zoom regions of the 2D region on the projected picture of the omnidirectional video, in response to a zoom operation on the 2D region on the projected picture of the omnidirectional video.

In an embodiment of the present disclosure, there is further provided a video data processing method applied to a server, the method including: determining a sphere region of an omnidirectional video, and one or more zoom regions of the sphere region on a projected picture of the omnidirectional video; and generating a media presentation description file of the omnidirectional video, the media presentation description file including a sphere region zoom descriptor indicating the sphere region of the omnidirectional video and the one or more zoom regions of the sphere region on the projected picture of the omnidirectional video.

In an embodiment of the present disclosure, there is further provided a video data processing method applied to a server, the method including: determining a 2D region on a projected picture of an omnidirectional video, and one or more zoom regions of the 2D region on the projected picture of the omnidirectional video; and generating a media presentation description file of the omnidirectional video, the media presentation description file including a 2D region zoom descriptor indicating the 2D region on the projected picture of the omnidirectional video and the one or more zoom regions of the 2D region on the projected picture of the omnidirectional video.

In an embodiment of the present disclosure, there is further provided a video data processing method applied to a terminal, the method including: receiving a media presentation description file, where the media presentation description file includes a sphere region zoom descriptor for indicating a sphere region of an omnidirectional video and one or more zoom regions of the sphere region on a projected picture of the omnidirectional video; and requesting to obtain, according to the sphere region zoom descriptor, an omnidirectional video file corresponding to a zoom operation on the sphere region of the omnidirectional video.

In an embodiment of the present disclosure, there is further provided a video data processing method applied to a terminal, the method including: receiving a media presentation description file, where the media presentation description file includes a 2D region zoom descriptor indicating a 2D region on a projected picture of an omnidirectional video and one or more zoom regions of the 2D region on the projected picture of the omnidirectional video; and requesting to obtain, according to the 2D region zoom descriptor, an omnidirectional video file corresponding to a zoom operation on the 2D region on the projected picture of the omnidirectional video.

In an embodiment of the present disclosure, there is further provided a video data processing device, including: an encoding unit and a storage unit, where the encoding unit is configured to determine a sphere region of an omnidirectional video, encode and generate video data of a projection region of the sphere region on a projected picture of the omnidirectional video, and video data of one or more zoom regions of the sphere region on the projected picture of the omnidirectional video; and the storage unit is configured to store the encoded video data, information on the sphere region of the omnidirectional video, and information on the one or more zoom regions of the sphere region on the projected picture of the omnidirectional video; or where the encoding unit is configured to determine a 2D region on a projected picture of an omnidirectional video, encode and generate video data of the 2D region, and video data of one or more zoom regions of the 2D region on the projected picture of the omnidirectional video; and the storage unit is configured to store the encoded video data, information on the 2D region on the projected picture of the omnidirectional video, and information on the one or more zoom regions of the 2D region on the projected picture of the omnidirectional video.

In an embodiment of the present disclosure, there is further provided a video data processing device, including: a first determination unit and a processing unit, where the first determination unit is configured to determine a sphere region of an omnidirectional video, and one or more zoom regions of the sphere region on a projected picture of the omnidirectional video; and the processing unit is configured to decode and play video data of the one or more zoom regions of the sphere region on the projected picture of the omnidirectional video, in response to a zoom operation on the sphere region of the omnidirectional video; or where the first determination unit is configured to determine a 2D region on a projected picture of an omnidirectional video, and one or more zoom regions of the 2D region on the projected picture of the omnidirectional video; and the processing unit is configured to decode and play video data of the one or more zoom regions of the 2D region on the projected picture of the omnidirectional video, in response to a zoom operation on the 2D region on the projected picture of the omnidirectional video.

In an embodiment of the present disclosure, there is further provided a video data processing device, including: a second determination unit and a generation unit, where the second determination unit is configured to determine a sphere region of an omnidirectional video, and one or more zoom regions of the sphere region on a projected picture of the omnidirectional video; and the generation unit is configured to generate a media presentation description file of the omnidirectional video, the media presentation description file including a sphere region zoom descriptor indicating the sphere region of the omnidirectional video and the one or more zoom regions of the sphere region on the projected picture of the omnidirectional video; or where the second determination unit is configured to determine a 2D region on a projected picture of an omnidirectional video, and one or more zoom regions of the 2D region on the projected picture of the omnidirectional video; and the generation unit is configured to generate a media presentation description file of the omnidirectional video, the media presentation description file including a 2D region zoom descriptor indicating the 2D region on the projected picture of the omnidirectional video and the one or more zoom regions of the 2D region on the projected picture of the omnidirectional video.

In an embodiment of the present disclosure, there is further provided a video data processing device, including: a receiving unit and a requesting unit, where the receiving unit is configured to receive a media presentation description file, where the media presentation description file includes a sphere region zoom descriptor for indicating a sphere region of the omnidirectional video and one or more zoom regions of the sphere region on a projected picture of the omnidirectional video; and the requesting unit is configured to request to obtain, according to the sphere region zoom descriptor, an omnidirectional video file corresponding to a zoom operation on the sphere region of the omnidirectional video; or where the receiving unit is configured to receive a media presentation description file, where the media presentation description file includes a 2D region zoom descriptor indicating a 2D region on a projected picture of an omnidirectional video and one or more zoom regions of the 2D region on the projected picture of the omnidirectional video; and the requesting unit is configured to request to obtain, according to the 2D region zoom descriptor, an omnidirectional video file corresponding to a zoom operation on the 2D region on the projected picture of the omnidirectional video.

In an embodiment of the present disclosure, there is further provided a server, including: a first processor, and a first memory storing a computer program executable on the processor, where the first processor is configured to, when executing the computer program, perform steps of the above method at server side.

In an embodiment of the present disclosure, there is further provided a terminal, including: a second processor, and a second memory storing a computer program executable on the processor, where the second processor is configured to, when executing the computer program, perform steps of the above method at terminal side.

In an embodiment of the present disclosure, there is further provided a storage medium storing a computer program thereon, where the computer program, when executed by a processor, causes steps of the above method at server side to be implemented, or causes steps of the above method at terminal side to be implemented.

The video data processing method and device, related apparatuses and storage medium provided in the embodiments of the disclosure provide, for zooming of a sphere region or 2D region of the omnidirectional video, information on one or more zoom regions of the sphere region or the 2D region of the omnidirectional video so that while the omnidirectional video is played, the omnidirectional video data is directly zoomed based on the provided zoom related information without switching code streams, thereby realizing continuity in the zoom operation on the sphere region or the 2D region of the omnidirectional video, ensuring the video quality of a region of interest for the user, and improving service experience of the omnidirectional video.

BRIEF DESCRIPTION OF THE DRAWINGS

FIG. 14 is a schematic flowchart of the encoding, file packaging and playing of an omnidirectional video according to an application example of the disclosure;

FIG. 15 is a schematic flowchart of processing by a video player according to an application embodiment of the disclosure;

DETAILED DESCRIPTION

For clarity and better understanding of the objects, technical solution and advantages of the disclosure, embodiments of the disclosure will now be described in detail in conjunction with the accompanying drawings. It should be noted that the embodiments of the disclosure and features therein may be arbitrarily combined with each other without conflict.

In addition, it should be noted that terms like "first", "second" are used herein for the purpose of distinguishing similar objects instead of indicating a particular order or sequence.

Firstly, some terms are defined. In general, embodiments of the disclosure provide techniques that may be used for video data processing. In some embodiments, storage of the omnidirectional video data in a file based on an ISO base media file format (ISOBMFF) is implemented. Among them, the ISO base media file format such as a restricted scheme information box, a visual sample entry, and the like may be operated with reference to the MPEG-4 Part 12 ISO base media file format established by the Moving Picture Experts Group (MPEG) of ISO/IEC JTC1/SC29/WG11. The projection and package steps of the omnidirectional video, and their basic formats may be operated with reference to the MPEG-I Part 2 OMAF (omnidirectional media format) established by the Motion Picture Experts Group (MPEG) of ISO/IEC JTC1/SC29/WG11.

All data in the ISO base media file format is contained in a data box (or, box), i.e., the ISO base media file is composed of several boxes each having a type and a length that can be regarded as a data object. One box which may contain another box is referred to as a container box. One ISO base media file will first have and only have one "ftyp" type box, which acts as a flag for the file format and contains some information about the file. Then there will be one and only one "MOOV" type box (Movie Box), which is a container box having sub-boxes containing metadata information of the media. Media data of the ISO base media file is contained in a "mdat" type box (Media Data Box), which is also a container box, and a plurality of them or none (when the media data all refer to other files) may be present, and the structure of the media data is described by metadata.

Figure 1:
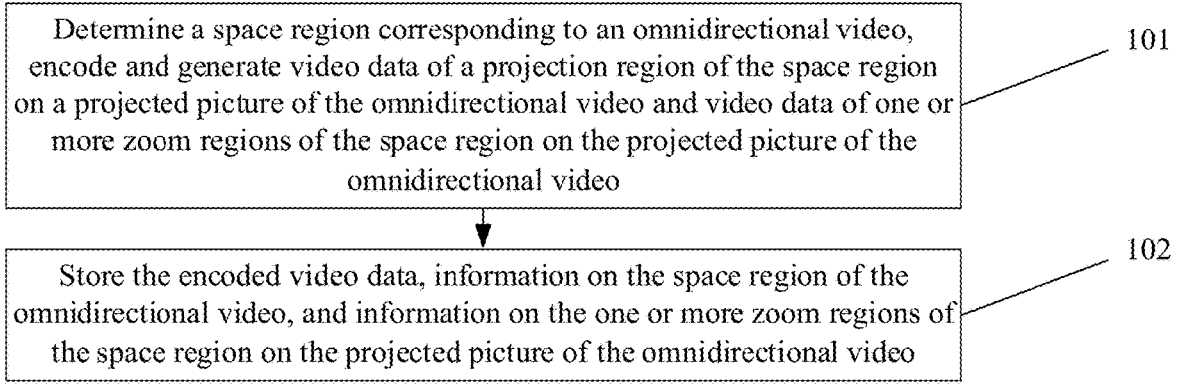
FIG. 1 is a schematic flowchart of a video data processing method at a server side according to an embodiment of the disclosure.

In an embodiment of the present disclosure, there is provided a video data processing method applied to a server. The method, as shown in FIG. 1, includes steps 101 and 102.

At step 101, a space region corresponding to an omnidirectional video is determined, and video data of a projection region of the space region on a projected picture of the omnidirectional video and video data of one or more zoom regions of the space region on the projected picture of the omnidirectional video are encoded and generated.

At step 102: the encoded video data, information on the space region of the omnidirectional video and information on the one or more zoom regions of the space region on the projected picture of the omnidirectional video.

In other words, in step 101, a space region corresponding to an omnidirectional video is determined, and the following video data are encoded and generated: 1) video data corresponding to a projection region on a projected picture of the omnidirectional video; and 2) video data corresponding to one or more zoom regions on the projected picture of the omnidirectional video, where the projection region on the projected picture corresponds to the determined space region. In addition, in step 102, the information on the space region of the omnidirectional video refers to information about the space region, and the information on the one or more zoom regions refers to information about the one or more zoom regions.

In practical applications, the space region may have multiple expression forms, for example, represented by spherical coordinates, and then, the space region is a sphere region of the omnidirectional video in a spherical coordinate system. The sphere region includes information on one or more of: a center point of the sphere region, an azimuth angle range and an elevation angle range of the sphere region; where the center point of the sphere region includes: an azimuth angle at the center point, an elevation angle at the center point and a tilt angle at the center point.

The space region may also be represented by two-dimensional Cartesian coordinates, in which case the space region is a two dimensional (2D) region on a projected picture of the omnidirectional video in a two-dimensional Cartesian coordinate system. The 2D region includes information on one or more of: width, height, vertical offset, and horizontal offset of the 2D region.

Figure 2:
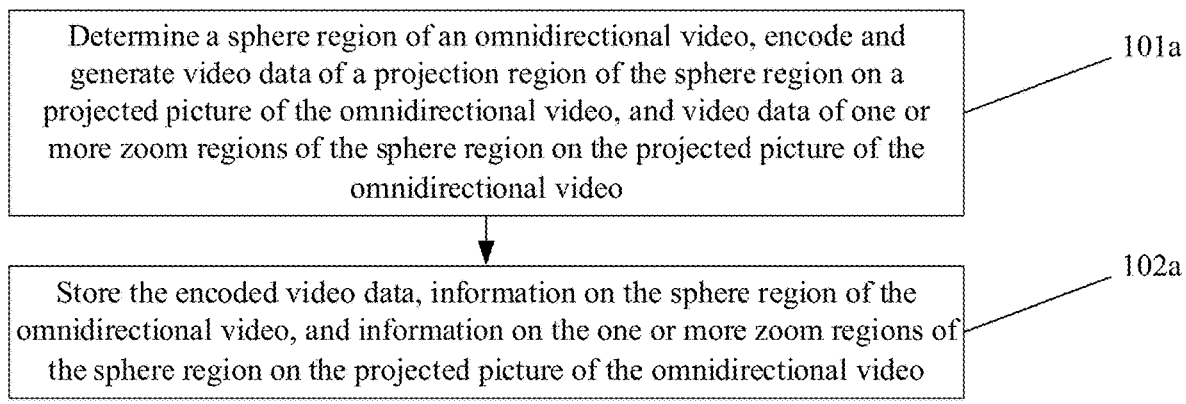
FIG. 2 is a schematic flowchart of a video data processing method at a server side according to an embodiment of the disclosure.

In an example, when the space region is a sphere region of an omnidirectional video, as shown in FIG. 2, the steps 101 and 102 may be implemented by the following steps 101a to 102a.

At step 101a, a sphere region of an omnidirectional video is determined, and video data of a projection region of the sphere region on a projected picture of the omnidirectional video and video data of one or more zoom regions of the sphere region on the projected picture of the omnidirectional video are encoded and generated.

At step 102a, the encoded video data, information on the sphere region of the omnidirectional video, and information on the one or more zoom regions of the sphere region on the projected picture of the omnidirectional video are stored.

Figure 3:
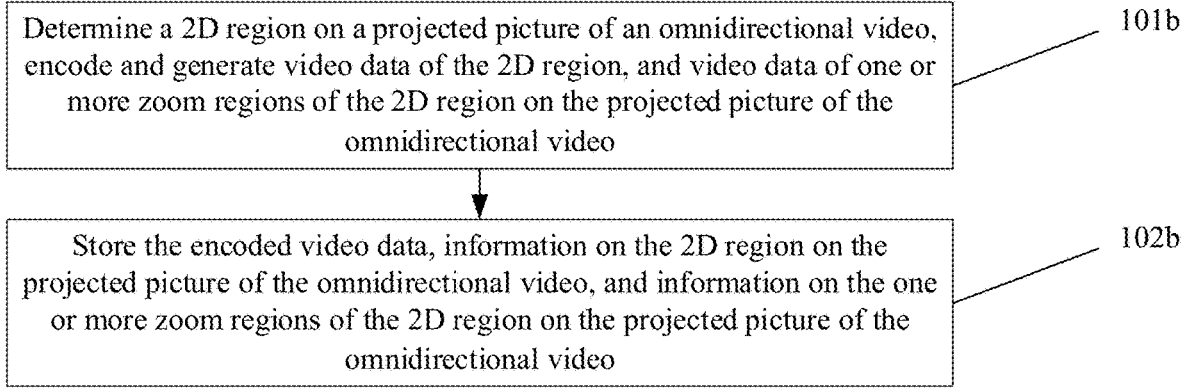
FIG. 3 is a schematic flowchart of another video data processing method at a server side according to an embodiment of the disclosure.

In another example, when the space region is a 2D region on the projected picture of the omnidirectional video, as shown in FIG. 3, the steps 101 and 102 of FIG. 1 may be implemented by the following steps 101b to 102b.

At step 101b, a 2D region on a projected picture of an omnidirectional video is determined, and video data of the 2D region, and video data of one or more zoom regions of the 2D region on the projected picture of the omnidirectional video are encoded and generated.

At step 102b, the encoded video data, information on the 2D region on the projected picture of the omnidirectional video, and information on the one or more zoom regions of the 2D region on the projected picture of the omnidirectional video are stored.

The solutions in the embodiments of the present disclosure provide, for zooming of a sphere region or 2D region of the omnidirectional video, information on one or more zoom regions of the sphere region or the 2D region of the omnidirectional video. In this way, a correspondence of a projection region of the sphere region or the 2D region on the projected picture and one or more zoom regions of the sphere region or the 2D region on the projected picture is established. In this manner, while the omnidirectional video is played, the omnidirectional video data is directly zoomed based on the provided zoom region related information without switching code streams, thereby realizing continuity in the zoom operation on the sphere region or the 2D region of the omnidirectional video, ensuring the video quality of a region of interest for the user, and improving service experience of the omnidirectional video.

In practical applications, the server may be a content source server (responsible for capturing, encoding and compressing, fragment packaging, and the like of an omnidirectional audio/video content source).

When the space region is a sphere region of an omnidirectional video, the steps 101a and 102a include the following processes.

In step 101a, in an embodiment, the sphere region of the omnidirectional video has video data of different resolutions or qualities in different zoom regions on the projected picture of the omnidirectional video.

In step 101a, in an embodiment, the step of encoding and generating video data of the projection region of the sphere region on the projected picture of the omnidirectional video and video data of one or more zoom regions of the sphere region on the projected picture of the omnidirectional video includes: encoding and generating, for a plurality of omnidirectional video bit streams of the same content source, video data of different zoom regions of the sphere region of the omnidirectional video on the projected picture of the omnidirectional video according to a motion constraint tile set (MCTS) mode with different resolutions or qualities. Tile regions of different resolutions or qualities with the same region number represent different zoom regions of the sphere region of the omnidirectional video on the projected picture of the omnidirectional video.

In step 101a, in practical applications, there may be a plurality of sphere regions having corresponding zoom regions, and based on this, in an embodiment, at least one sphere region of the omnidirectional video is determined.

In step 102a, the step of storing the encoded video data includes: storing the video data of the projection region of the sphere region on the projected picture of the omnidirectional video and the video data of the one or more zoom regions in the same video track or the same video file.

Here, in practical applications, the video track or file having the above video data stored therein may store only the above video data, or store the above video data as well as video data corresponding to other sphere regions at the same time. In an example, the video track or file may store video data of only one sphere region and its corresponding one or more zoom regions. In another example: the video track or file stores video data of a plurality of sphere regions and video data of one or more zoom regions corresponding to each of the sphere regions. In yet another example, the video track or file stores video data of one sphere region and its corresponding one or more zoom regions, and video data of a projection region of other sphere regions on the projected picture of the omnidirectional video. For example, assuming that a sphere region A has video data of one or more zoom regions corresponding thereto, then the video data of the projection region of the sphere region A on the projected picture of the omnidirectional video and the video data of the one or more zoom regions, are stored in the same video track or the same video file. For another example, assuming that there are sphere regions A, B, C, and the sphere region A has video data of one or more zoom regions corresponding thereto, while the sphere regions B and C have no video data of one or more zoom regions corresponding thereto, then the video data of the projection region of the sphere region A on the projected picture of the omnidirectional video and the video data of the one or more zoom regions, are stored in the same video track or the same video file, while the video data of the projection regions of the sphere regions B and C may also be present in said same video track or file.

In step 102a, the step of storing the information on the sphere region of the omnidirectional video, and the information on the one or more zoom regions of the sphere region on the projected picture of the omnidirectional video includes: storing, in a sphere region zooming box (SphereRegionZoomingBox) or coverage information box (CoverageInformationBox) in a video track sample entry, information on the sphere region of the omnidirectional video, and information on the one or more zoom regions of the sphere region on the projected picture of the omnidirectional video.

That is, information on the sphere region of the omnidirectional video, and information on the one or more zoom regions of the sphere region on the projected picture of the omnidirectional video, are stored in an element in the video track sample entry.

In an embodiment, when the above information is stored, a region zoom indicator element in the sphere region zooming box or coverage information box may be set to a designated value (e.g., 1) for indicating that one or more zoom regions of the sphere region are present on the projected picture of the omnidirectional video. In this manner, the terminal can quickly know whether one or more zoom regions of the sphere region are present on the projected picture of the omnidirectional video.

Here, for the sphere region zooming box, the video track carries video sample metadata using a visual sample entry (VisualSampleEntry). In an embodiment, the visual sample entry may contain a sphere region zooming box. The sphere region zooming box may include information on one or more of: one or more sphere regions overlaid by the video content relative to a global coordinate axis; and one or more zoom regions of the sphere region on the video picture.

In practical applications, for the restricted video sample entry type 'resv', the projected omnidirectional video scheme is used to indicate that the decoded picture is a packaged picture containing monocular or binocular stereoscopic contents. If the scheme_type within the scheme type box in the restricted scheme information box is equal to 'podv' (projected omnidirectional video), it indicates that the projected omnidirectional video scheme is adopted.

A format of the projected omnidirectional video picture is represented by a projected omnivideo box (ProjectedOmniVideoBox) contained in a scheme information box (SchemeInformationBox). When the scheme_type is 'podv', there is one and only one projected omnivideo box in the scheme information box. Based on this, in an embodiment, the projected omnivideo box may contain a sphere region zooming box. The sphere region zooming box may include information on one or more of: one or more sphere regions overlaid by the omnidirectional video content relative to a global coordinate axis; and one or more zoom regions of the sphere region on the projected picture of the omnidirectional video.

In case of a coverage information box, for the restricted video sample entry type 'resv', the projected omnidirectional video scheme is used to indicate that the decoded picture is a packaged picture containing monocular or binocular stereoscopic contents. If the scheme_type within the scheme type box in the restricted scheme information box is equal to 'podv' (projected omnidirectional video), it indicates that the projected omnidirectional video scheme is adopted.

A format of the projected omnidirectional video picture is represented by a projected omnivideo box contained in the scheme information box. When the scheme_type is 'podv', there is one and only one projected omnivideo box in the scheme information box. Based on this, in an embodiment, the projected omnivideo box may contain a coverage information box. The coverage information box may include information on one or more of: one or more sphere regions overlaid by the omnidirectional video content relative to a global coordinate axis; and one or more zoom regions of the sphere region on the projected picture of the omnidirectional video.

When the space region is a 2D region on the projected picture of the omnidirectional video, the steps 101b and 102b may include the following specific implementation.

In step 101b, in an embodiment, the 2D region has video data of different resolutions or qualities in different zoom regions on the projected picture of the omnidirectional video.

In step 101b, in an embodiment, the step of encoding and generating video data of the 2D region, and video data of one or more zoom regions of the 2D region on the projected picture of the omnidirectional video includes: encoding and generating, for a plurality of omnidirectional video bit streams of the same content source, video data of different zoom regions of the 2D region on the projected picture of the omnidirectional video according to an MCTS mode with different resolutions or qualities.

Tile regions of different resolutions or qualities with the same region number represent different zoom regions of the 2D region on the projected picture of the omnidirectional video on the projected picture of the omnidirectional video.

In step 101b, in practical applications, there may be a plurality of sphere regions having corresponding zoom regions, and based on this, in an embodiment, at least one 2D region on the projected picture of the omnidirectional video is determined.

In step 102b, the step of storing the encoded video data includes: storing the video data of the 2D region, and the video data of the one or more zoom regions of the 2D region on the projected picture of the omnidirectional video in the same video track or the same video file.

Here, in practical applications, the video track or file having the above video data stored therein may store only the above video data, or store the above video data as well as video data corresponding to other 2D regions at the same time. In an example, the video track or file may store video data of only one 2D region and its corresponding one or more zoom regions; or the video track or file may store video data of a plurality of 2D regions and one or more zoom regions corresponding to each of the 2D regions; or the video track or file may store video data of one 2D region and its corresponding one or more zoom regions, and video data of other 2D regions. For example, assuming that a 2D region A has video data of one or more zoom regions corresponding thereto, then the video data of the 2D region A, and the video data of the one or more zoom regions are stored in the same video track or the same video file. For another example, assuming that there are 2D regions A, B, C, the 2D region A has video data of one or more zoom regions corresponding thereto, while the 2D regions B and C have no video data of one or more zoom regions corresponding thereto, then the video data of the 2D region A, and the video data of the one or more zoom regions are stored in the same video track or the same video file, while the video data of the 2D regions B and C may also be present in said same video track or file.

In step 102b, the step of storing the information on the 2D region on the projected picture of the omnidirectional video, and the information on the one or more zoom regions of the 2D region on the projected picture of the omnidirectional video includes: storing, in a 2D region zooming box (2DRegionZoomingBox) or a region wise packing box (RegionWisePackingBox) in a video track sample entry, information on the 2D region on the projected picture of the omnidirectional video, and information on the one or more zoom regions of the 2D region on the projected picture of the omnidirectional video.

That is, information on the 2D on the projected picture of the omnidirectional video, and information on the one or more zoom regions of the 2D region on the projected picture of the omnidirectional video, are stored in an element in the video track sample entry.

In an embodiment, when the above information is stored, a region zoom indicator element in the 2D region zooming box or region wise packing box may be set to a designated value (e.g., 1) for indicating that one or more zoom regions of the 2D region are present on the projected picture of the omnidirectional video. In this manner, the terminal can quickly know whether one or more zoom regions of the 2D region are present on the projected picture of the omnidirectional video.

Here, for the 2D region zooming box, the video track carries video sample metadata using a visual sample entry. In an embodiment, the visual sample entry may contain a 2D region zooming box. The 2D region zooming box may include information on one or more of: a 2D region on the video picture; one or more zoom regions of the 2D region on the video picture.

In practical applications, for the restricted video sample entry type 'resv', the projected omnidirectional video scheme is used to indicate that the decoded picture is a packaged picture containing monocular or binocular stereoscopic contents. If the scheme_type within the scheme type box in the restricted scheme information box is equal to 'podv' (projected omnidirectional video), it indicates that the projected omnidirectional video scheme is adopted.

A format of the projected omnidirectional video picture is represented by a projected omnivideo box contained in the scheme information box. When the scheme_type is 'podv', there is one and only one projected omnivideo box in the scheme information box. Based on this, in an embodiment, the projected omnivideo box may contain a 2D region zooming box. The 2D region zooming box may include information on one or more of: a 2D region on a projected picture of an omnidirectional video; and one or more zoom regions of the 2D region on the projected picture of the omnidirectional video.

In case of a region wise packing box, for the restricted video sample entry type 'resv', the projected omnidirectional video scheme is used to indicate that the decoded picture is a packaged picture containing monocular or binocular stereoscopic contents. If the scheme_type within the scheme type box in the restricted scheme information box is equal to 'podv' (projected omnidirectional video), it indicates that the projected omnidirectional video scheme is adopted.

A format of the projected omnidirectional video picture is represented by a projected omnivideo box contained in the scheme information box. When the scheme_type is 'podv', there is one and only one projected omnivideo box in the scheme information box. Based on this, in an embodiment, the projected omnivideo box may contain a region wise packing box, where the region wise packing box may include information on one or more of: mapping of the omnidirectional video between a package region and the projection region in the 2D picture domain; and one or more zoom regions of the projection region on the projected picture of the omnidirectional video.

In an embodiment, the information on the zoom regions includes at least one of: the number of zoom regions; width, height, vertical offset and horizontal offset of the zoom region; a zoom ratio of the zoom region; a zoom algorithm type of the zoom region; a boundary symbolization type of the zoom region; a type of the zoom region; and text description of the zoom region.

In practical applications, the encoded video data, the information on the sphere region of the omnidirectional video, and the information on the one or more zoom regions of the sphere region on the projected picture of the omnidirectional video are sent to a streaming media server for storage by the server. Here, the streaming media server is mainly responsible for storage and transmission control of video media resources.

The terminal adopts a processing mode corresponding to that of the server to decode and play the omnidirectional video data.

Figure 4:
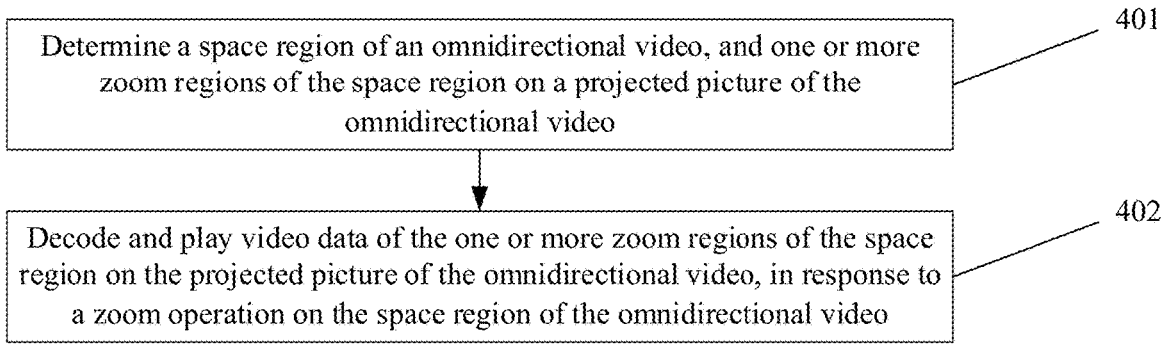
FIG. 4 is a schematic flowchart of a video data processing method at a terminal side according to an embodiment of the disclosure.

In view of this, in an embodiment of the present disclosure, there is further provided a video data processing method applied to a terminal. The method, as shown in FIG. 4, includes steps 401 and 402.

At step 401, a space region corresponding to an omnidirectional video and one or more zoom regions of the space region on a projected picture of the omnidirectional video are determined.

At step 402, video data of the one or more zoom regions of the space region on the projected picture of the omnidirectional video are decoded and played, in response to a zoom operation on the space region corresponding to the omnidirectional video.

Here, based on the information on the space region of the omnidirectional video, and the information on the one or more zoom regions of the space region on the projected picture of the omnidirectional video stored at the server side, the terminal determines a space region corresponding to the omnidirectional video, and one or more zoom regions of the space region on the projected picture of the omnidirectional video.

The solutions in the embodiments of the present disclosure provide, for zooming of a sphere region or 2D region of the omnidirectional video, information on one or more zoom regions of the sphere region or the 2D region of the omnidirectional video. In this manner, while the omnidirectional video is played, the omnidirectional video data is directly zoomed based on the provided zoom region related information without switching code streams, thereby realizing continuity in the zoom operation on the sphere region or the 2D region of the omnidirectional video, ensuring the video quality of a region of interest for the user, and improving service experience of the omnidirectional video.

Based on the information on the space region corresponding to the omnidirectional video, and the information on the one or more zoom regions of the space region on the projected picture of the omnidirectional video, the terminal may determine a space region corresponding to the omnidirectional video, and one or more zoom regions of the space region on the projected picture of the omnidirectional video.

In practical applications, the terminal may be a virtual reality head-mounted display (HDM) or the like that can track changes in the user's viewing angle and attitude and magnify a picture on a miniature display screen through a visual optical system located in front of the user's eyes to provide a VR video immersive display effect.

In practical applications, based on the elements in the video track sample entry in the received omnidirectional video file, the terminal determines a space region corresponding to an omnidirectional video, and one or more zoom regions of the space region on the projected picture of the omnidirectional video, and thus judges whether video data of a zoom region corresponding to a zoom operation on the space region exists.

In practical applications, after a zoom operation instruction is received (for example, when a director instructs or a user performs a zoom operation, the terminal will receive a zoom operation instruction), the terminal decodes and plays video data of the one or more zoom regions of the space region on the projected picture of the omnidirectional video, in response to a zoom operation on the space region of the omnidirectional video.

In practical applications, the zoom operation may include one zoom operation or a continuity of zoom operations. When receiving one zoom operation, the terminal decodes and plays video data of one zoom region of the space region on the projected picture of the omnidirectional video; and when receiving a plurality of zoom operations, the terminal decodes and plays video data of a plurality of zoom regions of the space region on the projected picture of the omnidirectional video.

In practical applications, the zoom operation may include a zoom operation for one space region corresponding to the omnidirectional video, or may include a zoom operation for a plurality of space regions corresponding to the omnidirectional video. When performing a zoom operation on one space region, the terminal decodes and plays video data of a zoom region of the one space region on the projected picture of the omnidirectional video; and when performing zoom operations on a plurality of space regions, the terminal decodes and plays video data of zoom regions of the plurality of space regions on the projected picture of the omnidirectional video.

Figure 5:
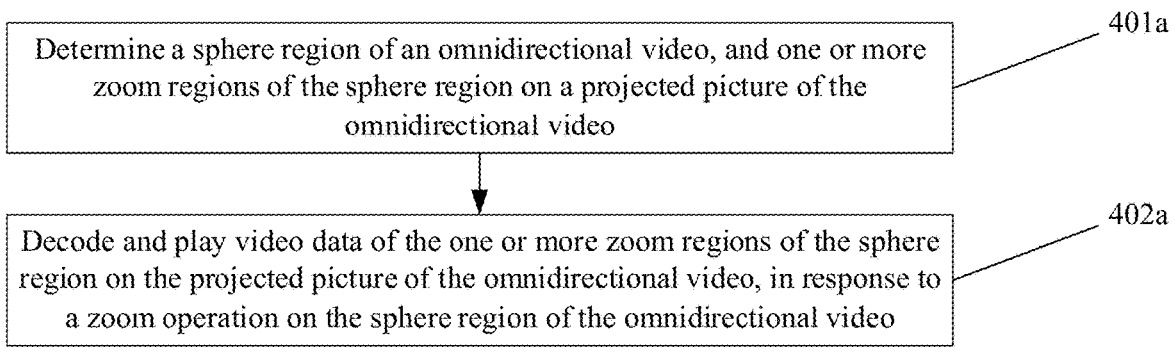
FIG. 5 is a schematic flowchart of a video data processing method at a terminal side according to an embodiment of the disclosure.

In some examples, when the space region is a sphere region of an omnidirectional video, as shown in FIG. 5, the steps 401 and 402 of FIG. 4 may be implemented by the following steps 401*a* to 402*a*.

At step 401*a*, a sphere region of an omnidirectional video and one or more zoom regions of the sphere region on a projected picture of the omnidirectional video are determined.

At step 402*a*, video data of the one or more zoom regions of the sphere region on the projected picture of the omnidirectional video are decoded and played, in response to a zoom operation on the sphere region of the omnidirectional video.

Figure 6:
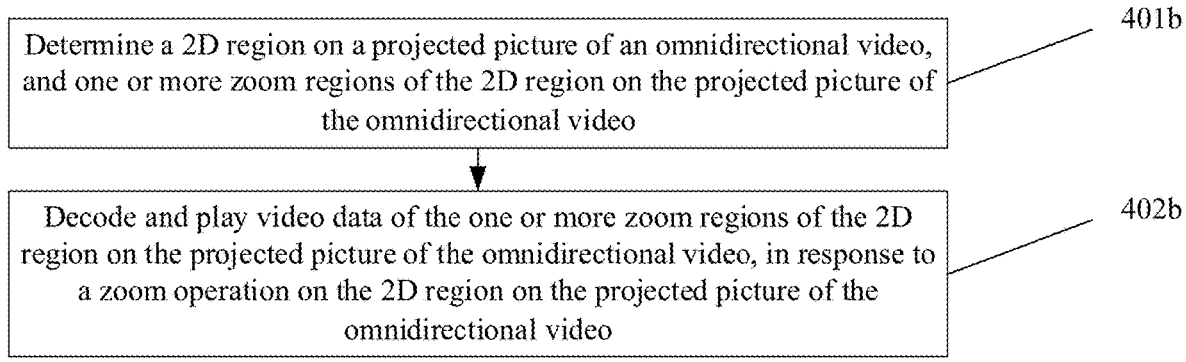
FIG. 6 is a schematic flowchart of another video data processing method at a terminal side according to an embodiment of the disclosure.

When the space region is a 2D region on the projected picture of the omnidirectional video, as shown in FIG. 6, the steps 401 and 402 of FIG. 4 may be implemented by the following steps 401*b* to 402*b*.

At step 401*b*, a 2D region on a projected picture of an omnidirectional video and one or more zoom regions of the 2D region on the projected picture of the omnidirectional video are determined.

At step 402*b*, video data of the one or more zoom regions of the 2D region on the projected picture of the omnidirectional video are decoded and played, in response to a zoom operation on the 2D region on the projected picture of the omnidirectional video.

When the space region is a sphere region of an omnidirectional video, the steps 401*a* and 402*a* include the following specific processing.

In step 401*a*, in an embodiment, the step of determining the sphere region of the omnidirectional video and one or more zoom regions of the sphere region on the projected picture of the omnidirectional video includes: determining, based on the elements in the video track sample entry, a sphere region of an omnidirectional video and one or more zoom regions of the sphere region on a projected picture of the omnidirectional video.

In some examples, based on the sphere region zooming box or coverage information box in the video track sample entry, the terminal determines a sphere region of an omnidirectional video, and one or more zoom regions of the sphere region on a projected picture of the omnidirectional video.

Here, based on the region zoom indicator element in the sphere region zooming box or coverage information box, the terminal may judge whether one or more zoom regions of the sphere region are present on the projected picture of the omnidirectional video.

In some examples, the terminal determines, based on a designated value (e.g., 1, etc.) of a region zoom indicator element in the sphere region zooming box or coverage information box, that one or more zoom regions of the sphere region are present on the projected picture of the omnidirectional video.

In step 401*a*, at least one sphere region of the omnidirectional video is determined.

When the space region is a 2D region on the projected picture of the omnidirectional video, the steps 401*b* and 402*b* may include the following implementation.

In step 401*b*, in an embodiment, the step of determining a 2D region on a projected picture of an omnidirectional video and one or more zoom regions of the 2D region on the projected picture of the omnidirectional video includes: determining, based on the elements in the video track sample entry, a 2D region on the projected picture of the omnidirectional video and one or more zoom regions of the 2D region on the projected picture of the omnidirectional video.

In some examples, based on the 2D region zooming box or region wise packing box in the video track sample entry, the terminal determines a 2D region on the projected picture of the omnidirectional video, and one or more zoom regions of the 2D region on the projected picture of the omnidirectional video.

Here, based on the region zoom indicator element in the 2D region zooming box or region wise packing box, the terminal may judge whether one or more zoom regions of the 2D region are present on the projected picture of the omnidirectional video.

In some examples, the terminal determines, based on a designated value (e.g., 1, etc.) of a region zoom indicator element in the 2D region zooming box or region wise packing box, that one or more zoom regions of the 2D region are present on the projected picture of the omnidirectional video.

In step 401*b*, at least one 2D region on the projected picture of the omnidirectional video is determined.

In an embodiment, the information on the zoom regions in the elements includes at least one of: the number of zoom regions; width, height, vertical offset and horizontal offset of the zoom region; a zoom ratio of the zoom region; a zoom algorithm type of the zoom region; a boundary symbolization type of the zoom region; a type of the zoom region; and text description of the zoom region.

As can be seen from the above description, the server determines a space region corresponding to an omnidirectional video, encodes and generates video data of a projection region of the space region on a projected picture of the omnidirectional video and video data of one or more zoom regions of the space region on the projected picture of the omnidirectional video; and stores the encoded video data, information on the space region of the omnidirectional video and information on the one or more zoom regions of the space region on the projected picture of the omnidirectional video; while the terminal determines a space region corresponding to an omnidirectional video, and one or more zoom regions of the space region on the projected picture of the omnidirectional video; and decodes and plays video data of one or more zoom regions of the space region on the projected picture of the omnidirectional video, thereby realizing package and play processing of the omnidirectional video data.

The embodiments of the present disclosure are described above from the perspective of file package, and now will be described below from the perspective of transmission.

Figure 7:
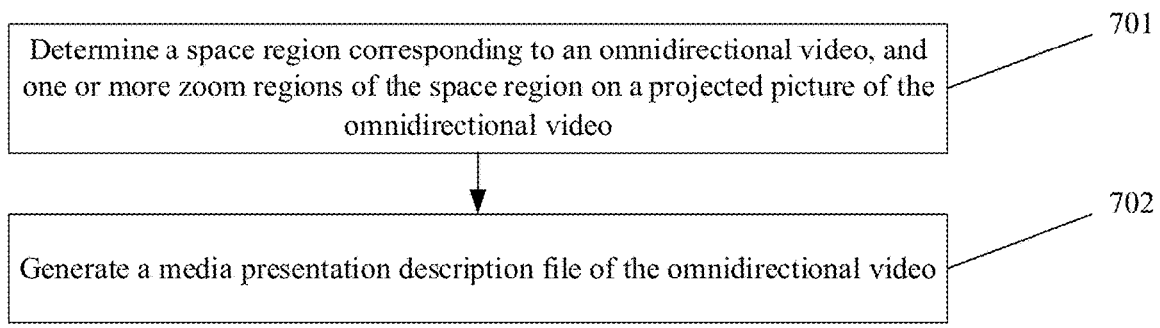
FIG. 7 is a schematic flowchart of another video data processing method at a server side according to an embodiment of the disclosure.

In an embodiment of the present disclosure, there is provided a video data processing method applied to a server. The method, as shown in FIG. 7, includes steps 701 and 702.

At step 701, a space region corresponding to an omnidirectional video, and one or more zoom regions of the space region on a projected picture of an omnidirectional video are determined.

At step 702, a media presentation description file of the omnidirectional video is generated.

Here, the media presentation description file includes a space region zoom descriptor indicating a space region corresponding to the omnidirectional video and one or more zoom regions of the space region on the projected picture of the omnidirectional video.

The solutions in the embodiments of the present disclosure provide, for zooming of a sphere region or 2D region of the omnidirectional video, information on one or more zoom regions of the sphere region or the 2D region of the omnidirectional video in a media presentation description file. In this manner, while the omnidirectional video is played, omnidirectional video data that can be directly zoomed are returned based on the provided zoom region related information without switching code streams, thereby realizing continuity in the zoom operation on the sphere region or the 2D region of the omnidirectional video, ensuring the video quality of a region of interest for the user, and improving service experience of the omnidirectional video.

Figure 8:
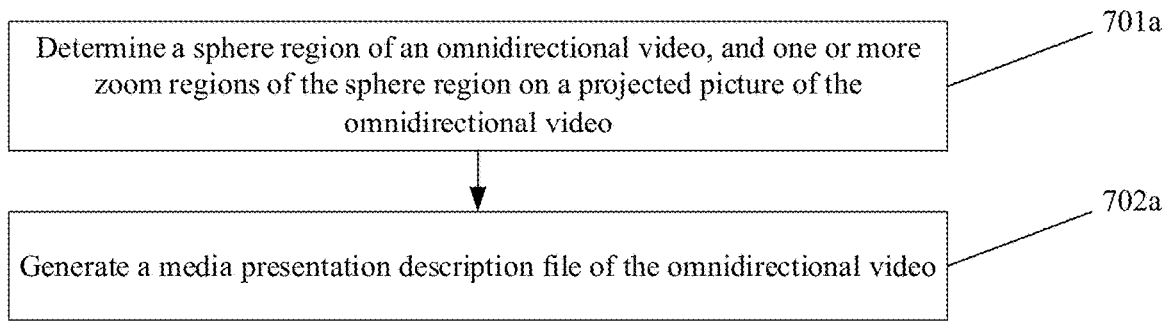
FIG. 8 is a first schematic flowchart of another video data processing method at a server side according to an embodiment of the disclosure.

In some examples, when the space region is a sphere region of an omnidirectional video, as shown in FIG. 8, the steps 701 and 702 of FIG. 7 may be implemented by the following steps 701a to 702a.

At step 701a, a sphere region of an omnidirectional video, and one or more zoom regions of the sphere region on a projected picture of the omnidirectional video are determined.

At step 702a: generating a media presentation description file of the omnidirectional video, the media presentation description file including a sphere region zoom (SRWZ) descriptor indicating a sphere region of the omnidirectional video and one or more zoom regions of the sphere region on the projected picture of the omnidirectional video.

Figure 9:
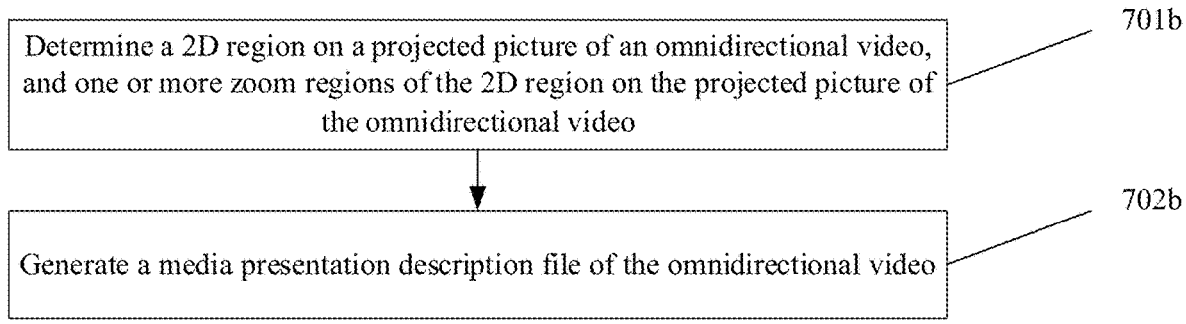
FIG. 9 is a second schematic flowchart of another video data processing method at a server side according to an embodiment of the disclosure.

When the space region is a 2D region on the projected picture of the omnidirectional video, as shown in FIG. 9, the steps 701 and 702 of FIG. 7 may be implemented by the following steps 701b to 702b.

At step 701b, a 2D region on a projected picture of an omnidirectional video, and one or more zoom regions of the 2D region on the projected picture of the omnidirectional video are determined.

At step 702b, a media presentation description file of the omnidirectional video is generated, the media presentation description file including a 2D region zoom (2DWZ) descriptor indicating a 2D region on the projected picture of the omnidirectional video and one or more zoom regions of the 2D region on the projected picture of the omnidirectional video.

In practical applications, the media presentation description file may be a media description file (M3U8) of HTTP Live Streaming (HLS) based on Hyper Text Transfer Protocol (HTTP), or a media presentation description (MPD) file of Dynamic Adaptive Streaming over HTTP (DASH), or the like.

When the space region is a sphere region of an omnidirectional video, the steps 701a and 702a include the following specific processing.

In step 701a, in an embodiment, at least one sphere region of the omnidirectional video may be determined.

In step 702a, in an embodiment, the sphere region zoom descriptor in the media presentation description file has a designated scheme identification (URI) attribute. That is, the terminal identifies the sphere region zoom descriptor using a designated URI attribute.

In step 702a, the sphere region zoom descriptor contains at least one of: the number of zoom regions; width, height, vertical offset and horizontal offset of the zoom region; a zoom ratio of the zoom region; a zoom algorithm type of the zoom region; a boundary symbolization type of the zoom region; a type of the zoom region; and text description of the zoom region.

When the space region is a 2D region on the projected picture of the omnidirectional video, the steps 701a and 702b may include the following implementation.

In step 701b, in an embodiment, at least one 2D region on the projected picture of the omnidirectional video may be determined.

In step 702b, in an embodiment, the 2D region zoom descriptor in the media presentation description file has a designated URI attribute.

In step 702b, the 2D region zoom descriptor contains at least one of: the number of zoom regions; width, height, vertical offset and horizontal offset of the zoom region; a zoom ratio of the zoom region; a zoom algorithm type of the zoom region; a boundary symbolization type of the zoom region; a type of the zoom region; and text description of the zoom region.

The terminal adopts a processing mode corresponding to that of the server to request to obtain the omnidirectional video data.

Figure 10:
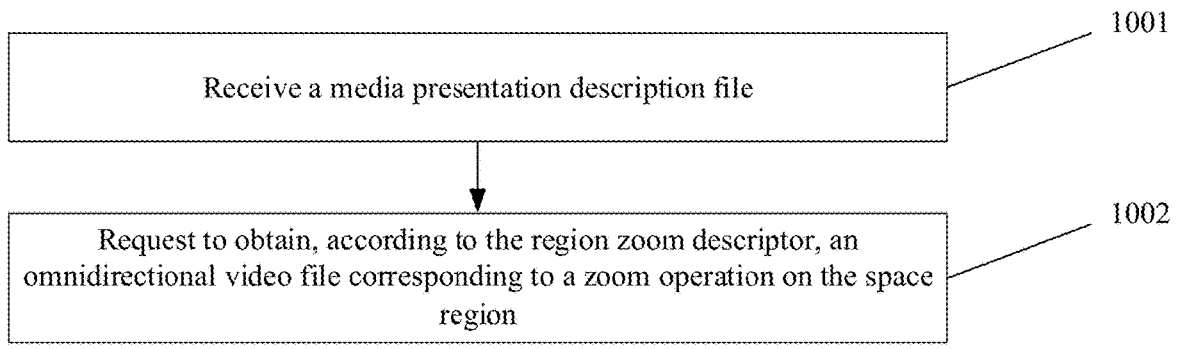
FIG. 10 is a schematic flowchart of another video data processing method at a terminal side according to an embodiment of the disclosure.

In view of this, in an embodiment of the present disclosure, there is further provided a video data processing method applied to a terminal. The method, as shown in FIG. 10, includes steps 1001 and 1002.

At step 1001, a media presentation description file is received.

The media presentation description file includes a region zoom descriptor indicating a space region corresponding to an omnidirectional video and one or more zoom regions of the space region on a projected picture of the omnidirectional video.

At step 1002, it is requested to obtain, according to the region zoom descriptor, an omnidirectional video file corresponding to a zoom operation on the space region.

The solutions in the embodiments of the present disclosure provide, for zooming of a sphere region or 2D region of the omnidirectional video, information on one or more zoom regions of the sphere region or the 2D region of the omnidirectional video in a media presentation description file. In this manner, while the omnidirectional video is played, omnidirectional video data that can be directly zoomed are requested based on the provided zoom region related information without switching code streams, thereby realizing continuity in the zoom operation on the sphere region or the 2D region of the omnidirectional video, ensuring the video quality of a region of interest for the user, and improving service experience of the omnidirectional video.

Figure 11:
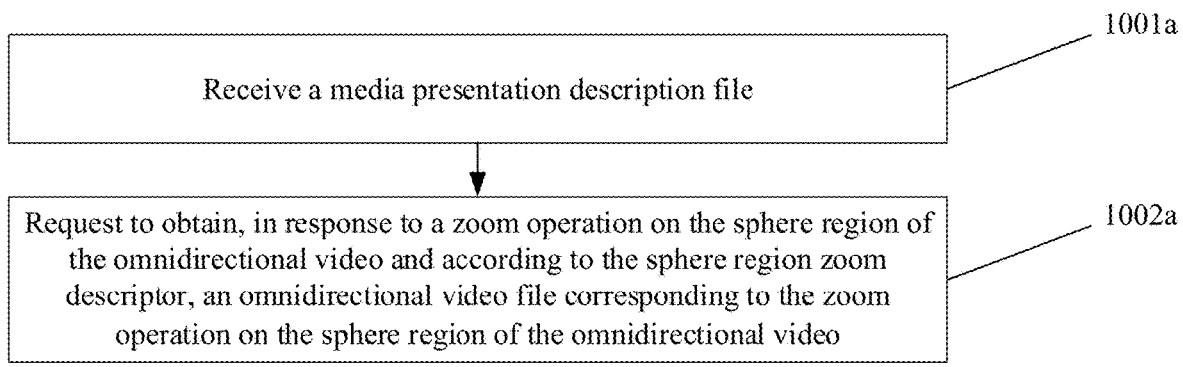
FIG. 11 is a first schematic flowchart of another video data processing method at a terminal side according to an embodiment of the disclosure.

In some examples, when the space region is a sphere region of an omnidirectional video, as shown in FIG. 11, the steps 1001 and 1002 of FIG. 10 may be implemented by the following steps 1101a to 1102a.

At step 1001a, a media presentation description file is received, in which the media presentation description file includes a sphere region zoom descriptor indicating a sphere region of an omnidirectional video and one or more zoom regions of the sphere region of the omnidirectional video on a projected picture of the omnidirectional video.

At step 1002a, it is requested to obtain, in response to a zoom operation on the sphere region of the omnidirectional video and according to the sphere region zoom descriptor, an omnidirectional video file corresponding to the zoom operation on the sphere region of the omnidirectional video.

Figure 12:
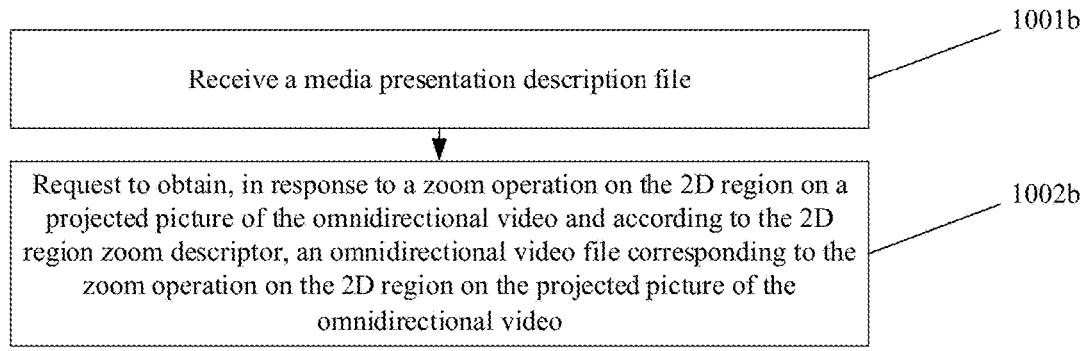
FIG. 12 is a second schematic flowchart of another video data processing method at a terminal side according to an embodiment of the disclosure.

When the space region is a 2D region on the projected picture of the omnidirectional video, as shown in FIG. 12, the steps 1001 and 1002 of FIG. 10 may be implemented by the following steps 1001b to 1002b.

At step 1001b, a media presentation description file is received, in which the media presentation description file includes a 2D region zoom descriptor indicating a 2D region on a projected picture of an omnidirectional video and one or more zoom regions of the 2D region on the projected picture of the omnidirectional video.

At step 1002b, it is requested to obtain, in response to a zoom operation on the 2D region on a projected picture of the omnidirectional video and according to the 2D region zoom descriptor, an omnidirectional video file corresponding to the zoom operation on the 2D region on the projected picture of the omnidirectional video.

When the space region is a sphere region of an omnidirectional video, the steps 1001a and 1002a may include the following specific processing.

In step 1001a, in an embodiment, at least one sphere region of the omnidirectional video exists.

In step 1002a, in an embodiment, the terminal identifies the sphere region zoom descriptor according to the URI attribute designated in the media presentation description file.

In practical applications, if the sphere region in the zoom operation is changed, and a local omnidirectional video file in the terminal contains video data of the zoom region corresponding to the zoom operation on the sphere region, the local omnidirectional video file is directly used. When no corresponding omnidirectional video file exists locally, if the sphere region zoom descriptor contains zoom region description information of the changed sphere region, the omnidirectional video file corresponding to the zoom operation on the changed sphere region will be requested to be obtained according to the sphere region zoom descriptor; and if the sphere region zoom descriptor contains no zoom region description information of the changed sphere region, a code stream switching technology in the existing art will be adopted to request the corresponding omnidirectional video file.

Based on this, in step 1002a, in an embodiment, it is requested to obtain a first omnidirectional video file corresponding to a first zoom operation on the sphere region of the omnidirectional video; a second zoom operation on a sphere region of the omnidirectional video is determined, the second zoom operation corresponding to a second sphere region different from a first sphere region corresponding to the first zoom operation; and it is requested to obtain, according to the sphere region zoom descriptor, a second omnidirectional video file corresponding to the second zoom operation.

More specifically, in the above step, it is determined that the second zoom operation corresponds to a first sphere region different from a second sphere region corresponding to the first zoom operation; and it is judged whether a second omnidirectional video file corresponding to the second zoom operation can be requested according to the sphere region zoom descriptor and a judgment result is obtained; when the judgment result represents that a second omnidirectional video file corresponding to the second zoom operation can be requested, it is requested to obtain the second omnidirectional video file corresponding to the second zoom operation; and when the judgment result represents that no omnidirectional video file corresponding to the second zoom operation can be requested, it is requested to obtain an omnidirectional video file of the corresponding code stream.

When the space region is a 2D region on the projected picture of the omnidirectional video, the steps 1001b and 1002b include the following specific processing.

In step 1001b, in an embodiment, at least one 2D region on the projected picture the omnidirectional video exists.

In step 1002b, in an embodiment, the terminal identifies the 2D region zoom descriptor according to the URI attribute designated in the media presentation description file.

In practical applications, if the 2D region in the zoom operation is changed, and a local omnidirectional video file in the terminal contains video data of the zoom region corresponding to the zoom operation on the 2D region, the local omnidirectional video file is directly used. When no corresponding omnidirectional video file exists locally, if the 2D region zoom descriptor contains zoom region description information of the changed 2D region, the omnidirectional video file corresponding to the zoom operation on the changed 2D region will be requested to be obtained according to the 2D region zoom descriptor; and if the sphere region zoom descriptor contains no zoom region description information of the changed 2D region, a code stream switching technology in the existing art will be adopted to request the corresponding omnidirectional video file.

Based on this, in step 1002b, in an embodiment, it is requested to obtain a third omnidirectional video file corresponding to a third zoom operation on the 2D region on a projected picture of the omnidirectional video; a fourth zoom operation on the 2D region on the projected picture of the omnidirectional video is determined, the fourth zoom operation corresponding to a first 2D region different from a second 2D region corresponding to the third zoom operation; and it is requested to obtain, according to the 2D region zoom descriptor, a fourth omnidirectional video file corresponding to the fourth zoom operation.

More specifically, in the above step, it is determined that a first 2D region corresponding to the fourth zoom operation is different from a second 2D region corresponding to the third zoom operation; it is judged whether a fourth omnidirectional video file corresponding to the fourth zoom operation can be requested according to the 2D region zoom descriptor and a judgment result is obtained; when the judgment result represents that a fourth omnidirectional video file corresponding to the fourth zoom operation can be requested, it is requested to obtain the fourth omnidirectional video file corresponding to the fourth zoom operation;

and when the judgment result represents that no omnidirectional video file corresponding to the fourth zoom operation can be requested, it is requested to obtain an omnidirectional video file of the corresponding code stream.

As can be seen from the above description, in the solutions of the embodiments of the present disclosure, the server determines a space region corresponding to an omnidirectional video, and one or more zoom regions of the space region on the projected picture of the omnidirectional video; and generates a media presentation description file of the omnidirectional video, the media presentation description file including a region zoom descriptor indicating a space region corresponding to an omnidirectional video and one or more zoom regions of the space region on a projected picture of the omnidirectional video; while the terminal receives a media presentation description file; and requests to obtain, according to the region zoom descriptor, an omnidirectional video file corresponding to a zoom operation on the space region, thereby realizing the transmission process of the omnidirectional video data.

The present disclosure is described in further details below with reference to application embodiments.

Figure 13:
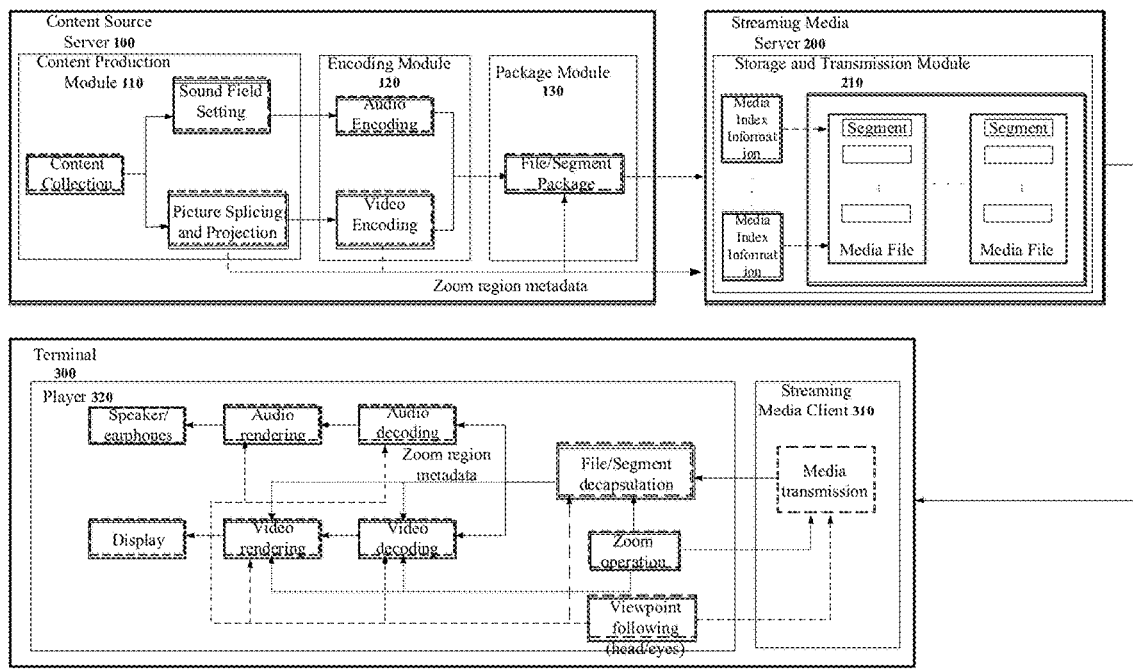
FIG. 13 is a schematic structural diagram of a video data processing system according to an application embodiment of the disclosure.

As shown in FIG. 13, an application embodiment of the present disclosure provides a video processing system, which may specifically be an omnidirectional video processing system, including: a content source server 100, a streaming media server 200, and a terminal 300.

The content source server 100 is responsible for capturing, encoding and compressing, and fragment packaging of an omnidirectional audio/video content source, and for generating omnidirectional video files of different zoom versions of an omnidirectional video sphere region. The content source server 100 includes: a content production module 110, an encoding module 120, and a package module 130.

Here, the content production module 110 performs recording of the real physical world audio-visual scenario using a set of cameras or a camera apparatus with multiple cameras and sensors, and an audio sensor. Video pictures shot by different cameras at the same moment are spliced into an omnidirectional video to be projected on a unit sphere.

The encoding module 120 is responsible for encoding and compressing digitized video signals and audio signals output from the content production module 110, and generally generates audio/video elementary streams of multiple bitrates to cover different network bandwidth requirements.

The package module 130 is responsible for packaging the audio/video elementary streams output from the encoding module 120 into a plurality of media segments with fixed time intervals and providing index information of the media segments. The index information includes: a media description file of HTTP-based HLS (M3U8), or an MPD file of DASH.

In some examples, the package module 130 stores, based on the box in the omnidirectional video track, information on the sphere region of the omnidirectional video, and information on the one or more zoom regions of the sphere region on the projected picture of the omnidirectional video; or the package module 130 stores, based on the box, information on the 2D region on the projected picture of the omnidirectional video, and information on the one or more zoom regions of the 2D region on the projected picture of the omnidirectional video.

The package module 130 creates corresponding index information for the packaged omnidirectional video track file, such as an MPD file of DASH, and the package module 130 adds an SRWZ descriptor defined in the embodiment of the present disclosure into the MPD file, which descriptor indicates the carried information on the sphere region of the omnidirectional video in an omnidirectional video track, and information on the one or more zoom regions of the sphere region on the projected picture of the omnidirectional video; or adds a 2DWZ descriptor into the MPD file, which descriptor indicates the carried information on the 2D region on the projected picture in an omnidirectional video track, and information on the one or more zoom regions of the 2D region on the projected picture of the omnidirectional video.

The streaming media server 200 is responsible for controlling storage and transmission of omnidirectional video media resources, and includes: a storage and transmission module 210. In practical applications, the streaming media server 200 may be any suitable type of network server, such as a center node or edge node server of a Content Delivery Network (CDN), or a proxy server, a World Wide Web (Web) server, or a combination thereof.

The storage and transmission module 210 is responsible for storing the media segments and the index file information thereof outputted from the package module 130, and performing transmission control of the omnidirectional video media resources according to the request from an omnidirectional video processing terminal 300.

The terminal 300 may include a streaming media client 310 and a video player 320. The streaming media client 310 is responsible for providing access request and transmission control to the omnidirectional video media resources. For example, a DASH client or an HLS client, submits a request to the streaming media server 200 for obtaining and parsing the index information of the media segment, and submits a request to the streaming media server 200 for obtaining a corresponding omnidirectional video file according to the information about changes in a user viewpoint provided by the video player 320.

The video player 320 is responsible for providing operations such as decoding, cache playing and the like on media resources such as an omnidirectional video. The video player 320, such as a virtual reality HDM, can track changes in the viewing angle and attitude of the user, and magnify a picture on a miniature display screen through a visual optical system located in front of the user's eyes to provide a VR video immersive display effect.

According to a director instruction or a user zoom operation during playing of the omnidirectional video, the streaming media client 310 submits a request to the streaming media server 200 for obtaining omnidirectional video files containing a space region of the omnidirectional video and one or more zoom regions of the space region on the projected picture of the omnidirectional video. The video player 320 decapsulates the omnidirectional video file, extracts one or more zoom regions of the space region on the projected picture of the omnidirectional video, and the video player 320 decodes and plays the corresponding zoom regions in the omnidirectional video file according to information such as a zoom ratio, a type of the zoom region, and the like, thereby realizing zoom operation on the sphere region during playing of the omnidirectional video.

Some important modules in the application embodiments of the present disclosure are described in detail below.

FIG. 14 is a schematic flowchart of the encoding, file packaging and playing of an omnidirectional video according to an application example of the disclosure. As shown in FIG. 14, in the application embodiment of the disclosure, the encoding module 120 encodes a plurality of bit streams from the same omnidirectional video source at different spatial resolutions respectively according to an MCTS manner, so as to form different zoom versions of the omnidirectional video corresponding to the same content. In FIG. 14, a bit stream at a resolution A corresponds to an original version of the omnidirectional video, and bit streams at resolutions B and C correspond to zoom versions of the omnidirectional video. The resolutions A, B and C may be different from each other.

The package module 130 stores a bit stream of each encoded MCTS sequence as a sub-picture track. As shown in FIG. 14, each sub-picture track has respective tile regions 1, 2 . . . 8, which respectively correspond to different sphere regions of the omnidirectional video through a specific projection mapping mechanism. Tile regions in the sub-picture track with the same number but different resolutions represent different zoom regions of the sphere region of the omnidirectional video on the projected picture of the omnidirectional video.

In some examples, when the space region is represented in the form of spherical coordinates, an extractor track is created for each selection of MCTSs that support a zoom operation on the omnidirectional video sphere region. The extractor track, carrying a sphere region zooming box or coverage information box as defined in the embodiments of the present disclosure, is configured to establish mapping between a sphere region of the omnidirectional video and one or more zoom regions of the sphere region on a projected picture of the omnidirectional video. In each sample of the extractor track, an extractor is created for each MCTS to extract data from tile regions of the sub-picture track that contains a projection region (original-resolution MCTS) on a projected picture of the omnidirectional video, and one or more zoom regions (high-resolution or low-resolution MCTSs). In the example of FIG. 14, the bit streams extracted by the extractor track include data of the projection region with resolution A and data of the zoom regions with resolutions B and C of the sphere regions of the omnidirectional video on the projected picture of the omnidirectional video corresponding to region numbers 1 and 2.

Accordingly, the streaming media client 310 selects a version of each sub-picture track to be requested to receive based on a current user viewport and the SRWZ descriptor in the media presentation description file (e.g., MPD file, etc.). The video player 320 parses the extractor track, reconstructs bit streams from different sub-picture tracks, and decodes and plays the reconstructed bit streams.

In some examples, as shown in FIG. 15, the video player 320 determines, based on the sphere region zooming box or coverage information box in the omnidirectional video track sample entry, a corresponding sphere region of the omnidirectional video, and one or more zoom regions of the sphere region on a projected picture of the omnidirectional video (step 1501); decodes and plays video data of the one or more zoom regions on the projected picture of the omnidirectional video, in response to a zoom operation on the sphere region of the omnidirectional video (step 1502).

Figure 16:
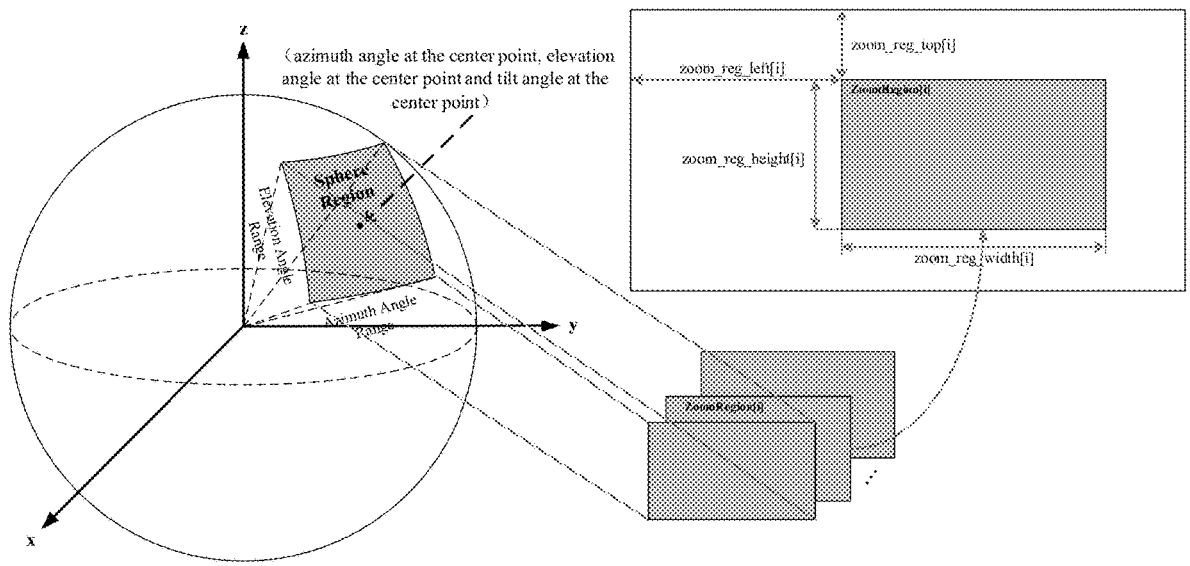
FIG. 16 is a schematic diagram showing a relationship between a sphere region of an omnidirectional video and a zoom region on a projected picture according to an application embodiment of the disclosure.

FIG. 16 is a schematic diagram showing a relationship between a sphere region of an omnidirectional video and a zoom region on a projected picture of the omnidirectional video. As can be seen from FIG. 16, information on the sphere region of the omnidirectional video in the box may include one or more of: information on center point of the sphere region; information on an azimuth angle range and an elevation angle range of the sphere region. The information on the center point of the sphere region may include: information on an azimuth angle at the center point, an elevation angle at the center point and a tilt angle at the center point.

The sphere region structure of an omnidirectional video is defined as follows:

```
SphereRegionStruct
aligned(8) SphereRegionStruct(range_included_flag) {
    signed int(32) centre_azimuth;
    signed int(32) centre_elevation;
    signed int(32) centre_tilt;
    if (range_included_flag) {
        unsigned int(32) azimuth_range;
        unsigned int(32) elevation_range;
    }
    unsigned int(1) interpolate;
    bit(7) reserved = 0;
}
``` where the centre_azimuth, centre_elevation and centre_tilt respectively indicate an azimuth angle, an elevation angle and a tilt angle of a center point of the sphere region; and azimuth_range and elevation_range define an azimuth angle range and an elevation angle range of the sphere region, respectively.

As can be seen from FIG. 16, the information in the box on the zoom regions on the projected picture of the omnidirectional video includes information on one or more of: the number of zoom regions; width, height, vertical offset and horizontal offset of the zoom region; a zoom ratio of the zoom region; a zoom algorithm type of the zoom region; a boundary symbolization type of the zoom region; a type of spherical zoom region; and text description of the zoom region.

The zoom region structure on a projected picture of the omnidirectional video is defined as follows:

```
RegionWiseZoomingStruct
aligned(8) class RegionWiseZoomingStruct( ) {
    unsigned int(8) num_regions;
    for (i = 0; i < num_regions; i++) {
        unsigned int(32) zoom_reg_width[i];
        unsigned int(32) zoom_reg_height[i];
        unsigned int(32) zoom_reg_top[i];
        unsigned int(32) zoom_reg_left[i];
        unsigned int(8) zoom_ratio;
        unsigned int(8) zoom_algorithm_type;
        unsigned int(8) zoom_symbolization_type;
        unsigned int(8) zoom_area_type;
        string zoom_description;
    }
}
``` where num_regions indicates the number of zoom regions corresponding to the sphere regions or 2D regions on a projected picture of the same omnidirectional video. There may be one or more zoom regions, where video data of different zoom regions have different resolutions or qualities;

zoom_reg_width[i], zoom_reg_height[i], zoom_reg_top[i] and zoom_reg_left[i] define the width, height, vertical offset and horizontal offset of the i-th zoom region, respectively;

zoom_ratio indicates a zoom_ratio of the zoom region;

zoom_algorithm_typ indicates a zoom algorithm type of the zoom region;

zoom_symbolization_typ indicates a boundary symbolization type of the zoom region;

zoom_area_type indicates a type of the zoom region, where classification of the types is as shown in Table 1; and zoom_description is a null-terminated UTF-8 character string that provides text description of the zoom region.

TABLE 1

| Value | Description |
| --- | --- |
| 0 | a zoom region for director's clips, i.e., the video is zoomed here based on the creative intention of the content author or content provider |
| 1 | a zoom region selected based on measurement of viewing statistics |
| 2 ... 239 | Reserved |
| 240 ... 255 | Undefined |

When the box is a sphere region zooming box, the sphere region zooming box may include information on one or more of: one or more sphere regions overlaid by the video content relative to a global coordinate axis; and one or more zoom regions of the sphere region on the video picture.

The syntax and semantics of the sphere region zooming box are defined as follows:

```
    SphereRegionZoomingBox
Box Type: 'srwz'
Container:  ProjectedOmniVideoBox or VisualSampleEntry
Mandatory: No
Quantity: Zero or one
    Sytax
aligned(8) class SphereRegionZoomingBox extends FullBox('srwz', 0, 0) {
    unsigned int(8) region_definition_type;
    unsigned int(8) num_regions;
    unsigned int(1) remaining_area_flag;
    unsigned int(1) view_idc_presence_flag;
    bit(1) reserved = 0;
    if (view_idc_presence_flag == 0) {
        unsigned int(2) default_view_idc;
        bit(6) reserved = 0;
    }
    for ( i = 0; i < num_regions; i++) {
        if (view_idc_presence_flag == 1) {
            unsigned int(2) view_idc;
            bit(6) reserved = 0;
        }
        if ((i < (num_regions − 1)) || (remaining_area_flag == 0))
            SphereRegionStruct(1);
        unsigned int(1) region_zoom_flag;
        bit(7) reserved = 0;
        if(region_zoom_flag){
          RegionWiseZoomingStruct( );
        }
    }
}
``` where region_definition_typ indicates a shape of the sphere region, which, when equal to 0, indicates that the sphere region is designated by four large circles, and, when equal to 1, indicates that the sphere region is designated by two azimuth circles and two elevation circles;

num_regions designates the number of sphere regions, where at least one sphere region is determined;

remaining_area_flag, when the value is 0, indicates that the sphere region is defined by the SphereRegionStruct (1) structure, and when the value is 1, indicates the remaining sphere regions except the one defined by num_regions−1 SphereRegionStruct (1) structures;

view_idc_presence_flag, when the value is 0, indicates that no view_idc exists, and when the value is 1, indicates that view_idc exists, indicating that the sphere region is related to a particular view (left, right, or both) or monocular picture;

default_view_idc, when the value is 0, indicates that the sphere region is a monocular picture, when the value is 1, indicates that the sphere region is a left view of a stereo picture, when the value is 2, indicates that the sphere region is a right view of a stereo picture, and when the value is 3, indicates that the sphere region includes a left view and a right view of a stereo picture;

view_idc, when the value is 0, indicates that the sphere region is a monocular picture, when the value is 1, indicates that the sphere region is a left view of a stereo picture, when the value is 2, indicates that the sphere region is a right view of a stereo picture, and when the value is 3, indicates that the sphere region includes a left view and a right view of a stereo picture;

region_zoom_flag, when the value is 0, indicates that no zoom region corresponding to the sphere region exists on the projected picture of the omnidirectional video, and when the value is 1, indicates that one or more zoom regions corresponding to the sphere region are present on the projected picture of the omnidirectional video; and RegionWiseZoomingStruct( ) represents the syntax structure of a zoom region of the sphere region on the projected picture of the omnidirectional video, as previously described.

In generation of the media presentation description information, for the SRWZ descriptor, taking an MPD file as an example, the following settings are performed:

A supplemental attribute element with a scheme identification @schemeIdUri being "urn:mpeg:mpegI:omaf:2018:2dwz" is called a SRWZ descriptor.

At most one SRWZ descriptor may exist in the representation hierarchy of the MPD file of DASH. The SRWZ descriptor should not appear in the MPD or AdaptationSet levels.

The SRWZ descriptor indicates a sphere region of an omnidirectional video, and one or more zoom regions of the sphere region on a projected picture of the omnidirectional video in an omnidirectional video track carried by its corresponding representation.

When there is an SRWZ descriptor applicable to the representation and the sphere region zooming box exists in a track corresponding to the representation, the SRWZ descriptor should carry information equivalent to the sphere region zooming box. The SRWZ descriptor should contain elements and properties as defined in Table 2.

TABLE 2

| Element or Attribute | Use | Data type | Description |
| --- | --- | --- | --- |
| sphRegionZoom | 1 | omaf:sphRegionZoomType | a container element whose properties and elements indicate sphere regions and corresponding zoom regions thereof |

TABLE 2-continued

| Element or Attribute | Use | Data type | Description |
| --- | --- | --- | --- |
| sphRegionZoom @shape_type | Optional | xs:unsignedByte | indicating a shape of the sphere region; when the value is 0, the sphere region is indicated by four large circles, and, when the value is 1, the sphere region is indicated by two azimuth angles and two elevation angles |
| sphRegionZoom@remaining_area_flag | Optional | xs:boolean | when the value is 0, indicating that all the sphere regions are defined by the element SphRegionZoom.sphRegionInfo, when the value is 1, indicating that all the sphere regions except the last one are defined by the element SphRegionZoom.sphRegionInfo, and the last remaining sphere region is a sphere region within the content coverage that is not covered by the sphere region set defined by the element SphRegionZoom.sphRegionInfo. |
| sphRegionZoom @view_idc_presence_flag | Optional | xs:boolean | when the value is 0, indicating that the attribute SphRegionZoom.sphRegionInfo@view_idc does not exist; and when the value is 1, the attribute SphRegionZoom.sphRegionInfo@view_idc exists, indicating that the sphere region is related to a particular view (left, right, or both) or monocular picture. |
| sphRegionZoom @default_view_idc | Mandatory if applicable | omaf:ViewType | when the value is 0, indicating that the sphere region is a monocular picture, when the value is 1, indicating that the sphere region is a left view of a stereo picture, when the value is 2, indicating that the sphere region is a right view of a stereo picture, and when the value is 3, indicating that the sphere region includes a left view and a right view of a stereo picture. |
| sphRegionZoom.sphRegionInfo | 1 . . . 255 | omaf:zoomInfoType | an element whose attribute describes sphere region information in the element sphRegionZoom, where at least one sphere region is designated. |
| sphRegionZoom.sphRegionInfo@view_idc | Mandatory if applicable | omaf:ViewType | when the value is 0, indicating that the sphere region is a monocular picture, when the value is 1, indicating that the sphere region is a left view of a stereo picture, when the value is 2, indicating that the sphere region is a right view of a stereo picture, and when the value is 3, indicating that the sphere region includes a left view and a right view of a stereo picture. |
| sphRegionZoom.sphRegionInfo@centre_azimuth | Mandatory if applicable | omaf:Range1 | an azimuth angle in the order of $2^{-16}$ degrees for indicating a center point of the sphere region. |
| sphRegionZoom.sphRegionInfo@centre_elevation | Mandatory if applicable | omaf:Range2 | an elevation angle in the order of $2^{-16}$ degrees for indicating a center point of the sphere region. |
| sphRegionZoom.sphRegionInfo@centre_tilt | Mandatory if applicable | omaf:Range1 | a tilt angle in the order of $2^{-16}$ degrees for indicating a center point of the sphere region. |
| sphRegionZoom.sphRegionInfo@azimuth_range | Mandatory if applicable | omaf:HRange | an azimuth angle range of the sphere region in the order of $2^{-16}$ degrees defined through a center point thereof. |
| sphRegionZoom.sphRegionInfo@elevation_range | Mandatory if applicable | omaf:HRange | an elevation angle range of the sphere region in the order of $2^{-16}$ degrees defined through a center point thereof |
| sphRegionZoom.zoomInfo | 1 . . . 255 | omaf:sphRegionInfoType | an element whose attribute is used to describe information on a zoom region corresponding to the sphere region defined in the element sphRegionZoom.sphRegionInfo, where at least one zoom region is designated. |
| sphRegionZoom.zoomInfo@zoom_region_left | Mandatory if applicable | xs:unsignedShort | a horizontal coordinate of an upper left corner of the zoom region in the projected picture designated in units of brightness samples. |
| sphRegionZoom.zoomInfo@zoom_region_right | Mandatory if applicable | xs:unsignedShort | a vertical coordinate of an upper left corner of the zoom region in the projected picture designated in units of brightness samples. |
| sphRegionZoom.zoomInfo@zoom_region_width | Mandatory if applicable | xs:unsignedShort | width of the zoom region in the projected picture designated in units of brightness samples. |
| sphRegionZoom.zoomInfo@zoom_region_height | Mandatory if applicable | xs:unsignedShort | height of the zoom region in the projected picture designated in units of brightness samples. |
| SphRegionZoom.zoomInfo@zoom_ratio | Mandatory if applicable | xs:unsignedByte | indicating a zoom ratio of a zoom region in the projected picture |
| SphRegionZoom.zoomInfo@zoom_algorithm_type | Optional | omaf:listofUnsignedByte | indicating a zoom algorithm of a zoom region in the projected picture |
| SphRegionZoom.zoomInfo@zoom_symbolization_type | Optional | omaf:listofUnsignedByte | indicating a zoom boundary symbolization type of a zoom region in the projected picture |
| SphRegionZoom.zoomInfo@zoom_description | Optional | xs:string | indicating description information of a zoom region in the projected picture |

When the box is a coverage information box, the coverage information box may include information on one or more of: one or more sphere regions overlaid by the omnidirectional video content relative to a global coordinate axis; and one or more zoom regions of the sphere region on the projected picture of the omnidirectional video.

The syntax and semantics of the coverage information box are defined as follows:

```
CoverageInformationBox
Box Type: 'covi'
Container: ProjectedOmniVideoBox
Mandatory: No
Quantity: Zero or one
    Syntax
aligned(8) class CoverageInformationBox extends FullBox('covi', 0, 0){
    ContentCoverageStruct( );
}
    Here, the syntax structure of ContentCoverageStruct is defined as
    follows:
        ContentCoverageStruct
aligned(8) class ContentCoverageStruct( ){
    unsigned int(8) coverage_shape_type;
    unsigned int(8) num_regions;
    unsigned int(1) view_idc_presence_flag;
    if (view_idc_presence_flag == 0) {
        unsigned int(2) default_view_idc;
        bit(5) reserved = 0;
    } else
        bit(7) reserved = 0;
    for ( i = 0; i < num_regions; i++) {
        if (view_idc_presence_flag == 1) {
            unsigned int(2) view_idc[i];
            bit(6) reserved = 0;
        }
        SphereRegionStruct(1);
        unsigned int(1) region_zoom_flag;
        bit(7) reserved = 0;
        if(region_zoom_flag){
            RegionWiseZoomingStruct( );
        }
    }
}
``` where coverage_shape_type indicates a shape of the sphere region, which, when equal to 0, indicates that the sphere region is designated by four large circles, and, when equal to 1, indicates that the sphere region is designated by two azimuth circles and two elevation circles;

num_regions designates the number of sphere regions, where at least one sphere region is determined;

view_idc_presence_flag, when the value is 0, indicates that no view_idc[i] exists, and when the value is 1, indicates that view_idc[i] exists, indicating that the sphere region is related to a particular view (left, right, or both) or monocular picture;

default_view_idc, when the value is 0, indicates that the sphere region is a monocular picture, when the value is 1, indicates that the sphere region is a left view of a stereo picture, when the value is 2, indicates that the sphere region is a right view of a stereo picture, and when the value is 3, indicates that the sphere region includes a left view and a right view of a stereo picture;

view_idc[i], when the value is 1, indicates that the i-th sphere region is a left view of a stereo picture, when the value is 2, indicates that the i-th sphere region is a right view of a stereo picture, and when the value is 3, indicates that the i-th sphere region includes a left view and a right view of a stereo picture. The value 0 is reserved;

region_zoom_flag, when the value is 0, indicates that no zoom region corresponding to the sphere region exists on the projected picture of the omnidirectional video, and when the value is 1, indicates that one or more zoom regions corresponding to the sphere region are present on the projected picture of the omnidirectional video; and RegionWiseZoomingStruct( ) represents the syntax structure of a zoom region of the sphere region on the projected picture of the omnidirectional video, as previously described.

In generation of the media presentation description information, the requirement of the SRWZ descriptor is completely the same as that of the SRWZ descriptor in the media presentation description information corresponding to the sphere region zooming box, and thus is not repeated here.

When the space region is represented in two-dimensional Cartesian coordinates, the package module 103 creates an extractor track for each selection of MCTSs that supports a zoom operation on a 2D region on the projected picture of the omnidirectional video. The extractor track, carrying a 2D region zooming box or region wise packing box as defined in the embodiments of the present disclosure, is configured to establish mapping between a 2D region on a projected picture of the omnidirectional video and one or more zoom regions of the 2D region on the projected picture of the omnidirectional video. In each sample of the extractor track, an extractor is created for each MCTS to extract data from tile regions of the sub-picture track that contains a projection region (original-resolution MCTS) on a projected picture of the omnidirectional video, and one or more zoom regions (high-resolution or low-resolution MCTSs). In the example of FIG. 14, the bit streams extracted by the extractor track include data of the projection region with resolution A and data of the zoom regions with resolutions B and C of the sphere regions of the omnidirectional video on the projected picture of the omnidirectional video corresponding to region numbers 1 and 2.

Accordingly, the streaming media client 310 selects a version of each sub-picture track to be requested to receive based on a current user viewport and the 2DWZ descriptor in the media presentation description file (e.g., MPD file, etc.). The video player 320 parses the extractor track, reconstructs bit streams from different sub-picture tracks, and decodes and plays the reconstructed bit streams.

Figure 17:
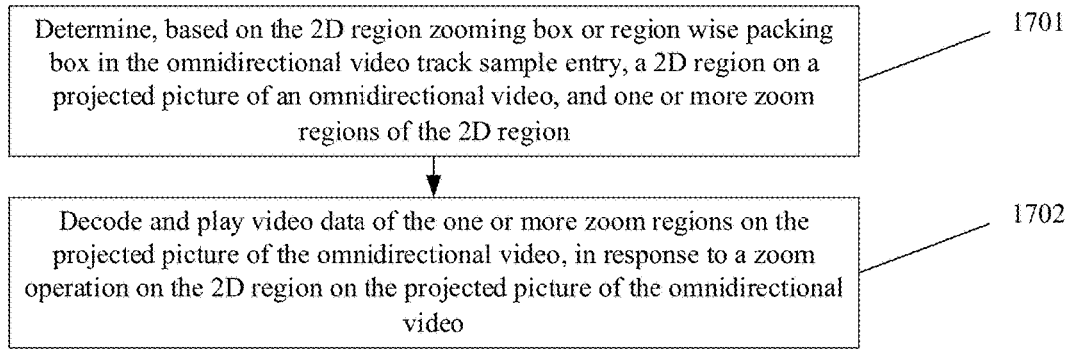
FIG. 17 is another schematic flowchart of processing by a video player according to an application embodiment of the disclosure.

In some examples, as shown in FIG. 17, the video player 320 determines, based on the 2D region zooming box or region wise packing box in the omnidirectional video track sample entry, a 2D region on a projected picture of an omnidirectional video, and one or more zoom regions of the 2D region (step 1701); decodes and plays video data of the one or more zoom regions on the projected picture of the omnidirectional video, in response to a zoom operation on the 2D region on the projected picture of the omnidirectional video (step 1702).

Figure 18:
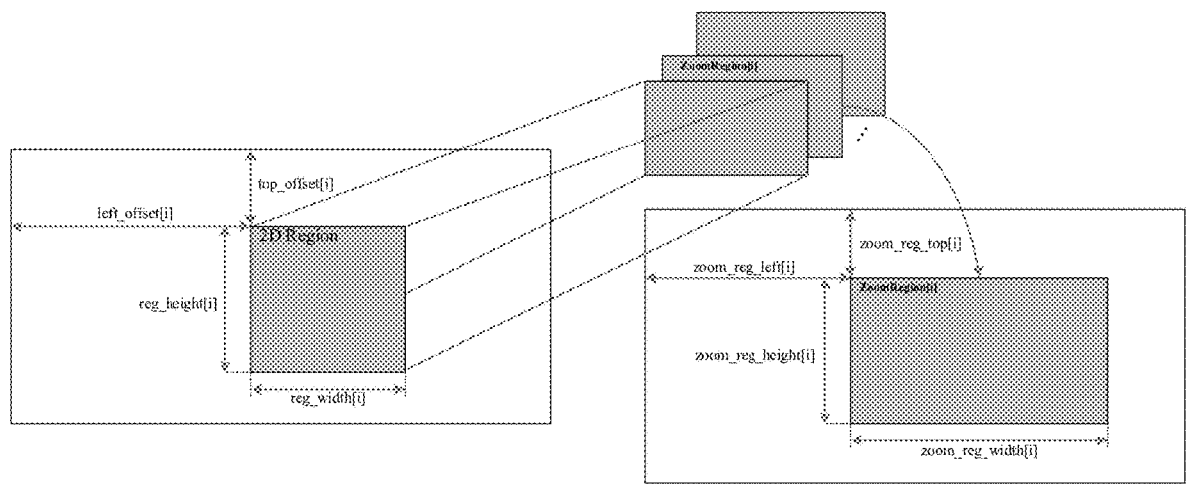
FIG. 18 is a schematic diagram showing a relationship between a 2D region on a projected picture of an omnidirectional video and a zoom region on the projected picture according to an application embodiment of the disclosure.

FIG. 18 is a schematic diagram showing a relationship between a 2D region on a projected picture of an omnidirectional video and a zoom region on the projected picture. As can be seen from FIG. 18, the information on the 2D region on the projected picture of the omnidirectional video in the box may include: width, height, vertical offset, and horizontal offset of the 2D region.

The information on the zoom regions on the projected picture of the omnidirectional video includes information on one or more of: the number of zoom regions; width, height, vertical offset and horizontal offset of the zoom region; a zoom ratio of the zoom region; a zoom algorithm type of the zoom region; a boundary symbolization type of the zoom region; a type of spherical zoom region; and text description of the zoom region.

The zoom region structure on a projected picture of the omnidirectional video is defined as above.

When the box is a 2D region zooming box, the 2D region zooming box may include information on one or more of: a 2D region on the video picture; and one or more zoom regions of the 2D region on the video picture.

The syntax and semantics of the 2D region zooming box are defined as follows:

```
2DRegionZoomingBox
Box Type:  '2dwz'
Container: VisualSampleEntry
Mandatory: No
Quantity: Zero or one
         Syntax
aligned(8) class 2DRegionZoomingBox extends FullBox('2dwz', 0, 0) {
    unsigned int(8) num_regions;
    unsigned int(1) remaining_area_flag;
    unsigned int(1) view_idc_presence_flag;
    bit(1) reserved = 0;
    if (view_idc_presence_flag == 0) {
        unsigned int(2) default_view_idc;
        bit(6) reserved = 0;
    }
    for (i = 0; i < num_regions; i++) {
        if (view_idc_presence_flag == 1) {
            unsigned int(2) view_idc;
            bit(6) reserved = 0;
        }
        if ((i < (num_regions - 1)) || (remaining_area_flag == 0)) {
            unsigned int(16) left_offset;
            unsigned int(16) top_offset;
            unsigned int(16) region_width;
            unsigned int(16) region_height;
        }
        unsigned int(1) region_zoom_flag;
        bit(7) reserved = 0;
        if(region_zoom_flag){
            RegionWiseZoomingStruct( ) ;
        }
    }
}
``` where num_regions designates the number of 2D regions, where at least one 2D region is determined;

remaining_area_flag, when the value is 0, indicates that a 2D plane region is defined by left_offset, top_offset, region_width and region_height, when the value is 1, indicates the remaining 2D regions except the one defined by num_regions−1 structures;

view_idc_presence_flag, when the value is 0, indicates that no view_idc exists, and when the value is 1, indicates that view_idc exists, indicating that the sphere region is related to a particular view (left, right, or both) or monocular picture;

default_view_idc, when the value is 0, indicates that the sphere region is a monocular picture, when the value is 1, indicates that the sphere region is a left view of a stereo picture, when the value is 2, indicates that the sphere region is a right view of a stereo picture, and when the value is 3, indicates that the sphere region includes a left view and a right view of a stereo picture;

view_idc, when the value is 0, indicates that the sphere region is a monocular picture, when the value is 1, indicates that the sphere region is a left view of a stereo picture, when the value is 2, indicates that the sphere region is a right view of a stereo picture, and when the value is 3, indicates that the sphere region includes a left view and a right view of a stereo picture;

left_offset, top_offset, region_width and region_height are integer values indicating the position and size of the 2D plane region. left_offset and top_offset indicate the horizontal and vertical coordinates of an upper left corner of a 2D region on the projected picture, respectively. region_width and region_height indicate width and height of a 2D region on the projected picture, respectively.

region_zoom_flag, when the value is 0, indicates that no zoom region corresponding to the 2D region exists on the projected picture of the omnidirectional video, and when the value is 1, indicates that one or more zoom regions corresponding to the 2D region are present on the projected picture of the omnidirectional video; and RegionWiseZoomingStruct( ), is a syntax structure of a zoom region of a 2D region on the projected picture of the omnidirectional video, as shown in FIG. 10.

In generation of the media presentation description information, for the 2DWZ descriptor, taking an MPD file as an example, the following settings are performed:

A supplemental attribute element with a scheme identification @schemeIdUri being "urn:mpeg:mpegI:omaf:2018:2dwz" is called a 2DWZ descriptor.

At most one 2DWZ descriptor may exist in the representation hierarchy of the MPD file of DASH. The 2DWZ descriptor should not appear in the MPD or AdaptationSet levels.

The 2DWZ descriptor indicates a 2D region on a projected picture of the omnidirectional video, and one or more zoom regions of the 2D region in an omnidirectional video track carried by its corresponding representation.

When there is a 2DWZ descriptor applicable to the representation and the 2D region zooming box also exists in a track corresponding to the representation, the 2DWZ descriptor should carry information equivalent to the 2D region zooming box. The 2DWZ descriptor should contain elements and properties as defined in Table 3.

TABLE 3

| Element or Attribute | Use | Data type | Description |
| --- | --- | --- | --- |
| twoDRegionZoom | 1 | omaf:twoDRegionZoomType | a container element whose properties and elements indicate 2D regions and corresponding zoom regions thereof |
| twoDRegionZoom@remaining_area_flag | Optional | xs:boolean | when the value is 0, indicating that all the 2D regions are defined by the element twoDRegionZoom.twoDRegionInfo, when the value is 1, indicating that all the 2D regions except the last one are defined by the element twoDRegionZoom.twoDRegionInfo, and the last remaining 2D region is a 2D region within the content coverage that is not covered by the 2D region set defined by the element twoDRegionZoom. twoDRegionInfo. |

TABLE 3-continued

| Element or Attribute | Use | Data type | Description |
| --- | --- | --- | --- |
| twoDRegionZoom@view_idc_presence_flag | Optional | xs:boolean | when the value is 0, indicating that the attribute twoDRegionZoom.twoDRegionInfo@view_idc does not exist; and when the value is 1, indicating that the attribute twoDRegionZoom.twoDRegionInfo@view_idc exists, indicating that the 2D region is related to a particular view (left, right, or both) or monocular picture. |
| twoDRegionZoom@default_view_idc | Mandatory if applicable | omaf:ViewType | when the value is 0, indicating that the 2D region is a monocular picture, when the value is 1, indicating that the 2D region is a left view of a stereo picture, when the value is 2, indicating that the 2D region is a right view of a stereo picture, when the value is 3, indicating that the 2D region includes a left view and a right view of a stereo picture. |
| twoDRegionZoom.twoDRegionInfo | 1 . . . 255 | omaf:twoDRegionInfoType | an element whose attribute describes 2D region region information in the element twoDRegionZoom, where at least one 2D region is designated. |
| twoDRegionZoom.twoDRegionInfo@view_idc | Mandatory if applicable | omaf:ViewType | when the value is 0, indicating that the 2D region is a monocular picture, when the value is 1, indicating that the 2D region is a left view of a stereo picture, when the value is 2, indicating that the 2D region is a right view of a stereo picture, when the value is 3, indicating that the 2D region includes a left view and a right view of a stereo picture. |
| twoDRegionZoom.twoDRegionInfo@left_offset | Mandatory if applicable | xs:unsignedShort | a horizontal coordinate of an upper left corner of the 2D region in the projected picture designated in units of brightness samples. |
| twoDRegionZoom.twoDRegionInfo@top_offset | Mandatory if applicable | xs:unsignedShort | a vertical coordinate of an upper left corner of the 2D region in the projected picture designated in units of brightness samples. |
| twoDRegionZoom.twoDRegionInfo@region_width | Mandatory if applicable | xs:unsignedShort | width of the 2D region in the projected picture designated in units of brightness samples. |
| twoDRegionZoom.twoDRegionInfo@region_height | Mandatory if applicable | xs:unsignedShort | height of the 2D region in the projected picture designated in units of brightness samples. |
| twoDRegionZoom.zoomInfo | 1 . . . 255 | omaf:zoomInfoType | an element whose attribute is used to describe information on a zoom region corresponding to the 2D region defined in the element twoDRegionZoom. twoDRegionInfo. where at least one zoom region is designated. |
| twoDRegionZoom.zoomInfo@zoom_region_left | Mandatory if applicable | xs:unsignedShort | a horizontal coordinate of an upper left corner of the zoom region in the projected picture designated in units of brightness samples. |
| twoDRegionZoom.zoomInfo@zoom_region_right | Mandatory if applicable | xs:unsignedShort | a vertical coordinate of an upper left corner of the zoom region in the projected picture designated in units of brightness samples. |
| twoDRegionZoom.zoomInfo@zoom_region_width | Mandatory if applicable | xs:unsignedShort | width of the zoom region in the projected picture designated in units of brightness samples. |
| twoDRegionZoom.zoomInfo@zoom_region_height | Mandatory if applicable | xs:unsignedShort | height of the zoom region in the projected picture designated in units of brightness samples. |
| twoDRegionZoom.zoomInfo@zoom_ratio | Mandatory if applicable | xs:unsignedByte | indicating a zoom ratio of a zoom region in the projected picture |
| twoDRegionZoom.zoomInfo@zoom_algorithm_type | Optional | omaf:listofUnsignedByte | indicating a zoom algorithm of a zoom region in the projected picture |
| twoDRegionZoom.zoomInfo@zoom_symbolization_type | Optional | omaf:listofUnsignedByte | indicating a zoom boundary symbolization type of a zoom region in the projected picture |
| twoDRegionZoom.zoomInfo@zoom_description | Optional | xs:string | indicating description information of a zoom region in the projected picture |

When the box is a region wise packing box, the region wise packing box may contain: mapping of the omnidirectional video between a package region and the projection region in the 2D picture domain; and one or more zoom regions of the projection region on the projected picture of the omnidirectional video.

The syntax and semantics of the region wise packing box are defined as follows:

---

RegionWisePackingBox
Box Type: 'rwpk'
Container: ProjectedOmniVideoBox
Mandatory: No
Quantity: Zero or one
    Syntax
aligned(8) class RegionWisePackingBox extends FullBox('rwpk', 0, 0) {
    RegionWisePackingStruct( );
}
    where The syntax of RegionWisePackingStruct in the box is
    defined as follows:
RegionWisePackingStruct
aligned(8) class RegionWisePackingStruct( ) {
    unsigned int(1) constituent_picture_matching_flag;
    bit(7) reserved = 0;
    unsigned int(8) num_regions;
    unsigned int(32) proj_picture_width;
    unsigned int(32) proj_picture_height;
    unsigned int(16) packed_picture_width;
    unsigned int(16) packed_picture_height;
    for (i = 0; i < num_regions; i++) {
        bit(3) reserved = 0;
        unsigned int(1) guard_band_flag[i];
        unsigned int(4) packing_type[i];
        if (packing_type[i] == 0) {
            RectRegionPacking(i);
            if (guard_band_flag[i])
                GuardBand(i);
        }
        unsigned int(1) region_zoom_flag;
        bit(7) reserved = 0;
        if(region_zoom_flag){
            RegionWiseZoomingStruct( ) ;
        }
}

---

Here, constituent_picture_matching_flag, when equal to 1, designates information on projection region, information on the package region and information on the guard band region in the syntax structure are respectively applied to each constituent picture; when equal to 0, designates information on projection region, information on the package region and information on the guard band region in the syntax structure are applicable to the projected picture;

num_regions designates the number of package regions, where at least one 2D region is determined;

prof_picture_width and prof_picture_height designate width and height of a projected picture with respect to a projected picture sample unit, respectively;

packed_picture_width and packed_picture_height designate width and height of a packed picture with respect to a packed picture sample unit, respectively;

guard_band_flag[i], when equal to 0, designates that the i-th package region has no guard band, when equal to 1, designates that the i-th package region has at least one guard band;

packing_type [i] designates a type of the region package; and

RectRegionPacking (i) designates a manner of region package between the i-th package region and the i-th projection region;

GuardBand (i) designates a guard band of the i-th package region;

region_zoom_flag, when the value is 0, indicates that no zoom region corresponding to the 2D region exists on the projected picture of the omnidirectional video, and when the value is 1, indicates that one or more zoom regions corresponding to the 2D region are present on the projected picture of the omnidirectional video; and RegionWiseZoomingStruct( ), is a syntax structure of a zoom region of a 2D region on the projected picture of the omnidirectional video, as shown in FIG. 10.

In generation of the media presentation description information, the requirement of the 2DWZ descriptor is completely the same as that of the 2DWZ descriptor in the media presentation description information corresponding to the 2D region zooming box, and thus is not repeated here.

As can be seen from the above description, when the space region is represented in the form of spherical coordinates, the package module 130 stores, based on the box, a sphere region of an omnidirectional video, and one or more zoom regions of the sphere region on a projected picture of the omnidirectional video; and when the space region is represented in the form of two-dimensional Cartesian coordinates, the package module stores, based on the box, a 2D region on a projected picture of an omnidirectional video, and one or more zoom regions of the 2D region.

Figure 19:
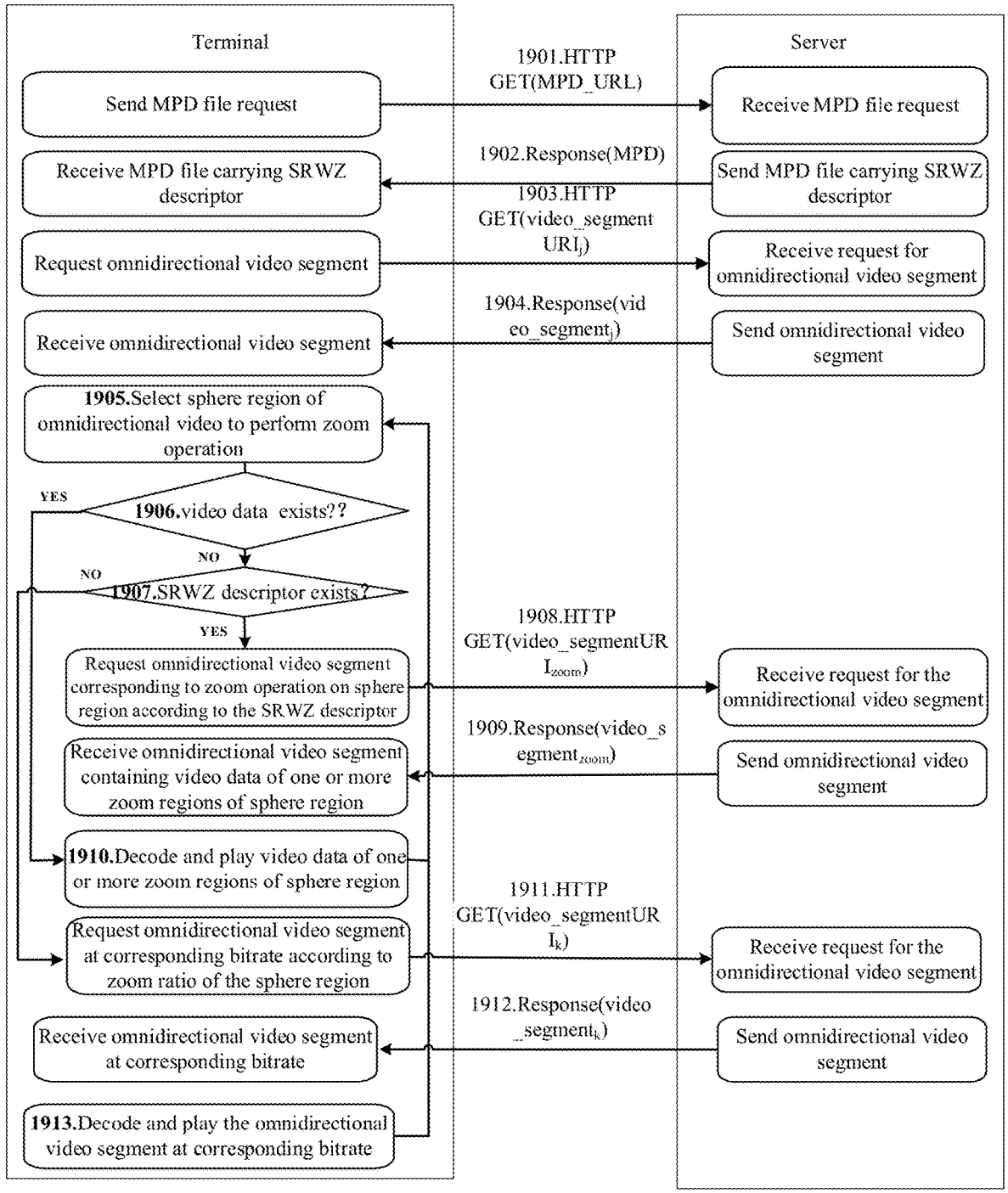
FIG. 19 is a schematic processing flowchart of the omnidirectional video data according to an application embodiment of the disclosure.

The following describes an omnidirectional video data processing procedure according to the application embodiment taking the space region being a sphere region and taking an MPD file as examples. As shown in FIG. 19, the flow includes the following steps 1901 to 1913.

At step 1901: the client sends a request for obtaining an MPD file (e.g., an HTTP GET message) to the server, where the request carries a URL address of the MPD file.

At step 1902: after receiving the request, the server returns the MPD file (e.g., an HTTP 200 response message) to the client, where the MPD file includes a SRWZ descriptor indicating a sphere region of an omnidirectional video and one or more zoom regions of the sphere region on the projected picture of the omnidirectional video.

At step 1903: after selecting a version of the video file requested to be played, the client sends a request (such as an HTTP GET message) for obtaining a video segment to the server, where the request carries a URL address of the video segment.

Here, generally, according to an initial viewing orientation of the user, and in combination with information such as a projection format, a video bitrate, and decoding parameters carried in the received MPD file, the client selects a version of the video file requested to be played.

At step 1904: after receiving the request, the server returns the video segment (e.g., an HTTP 200 response message) to the client.

Here, the video segment may be a panorama video data segment independent of the current user viewport, or a FOV video data segment associated with the current user viewport.

At step 1905: after receiving the video segment, the terminal (video player) selects a specific sphere region of the omnidirectional video in the spherical coordinate system to perform a zoom operation, and then step 1906 is performed.

Here, the zoom operation may be a zoom operation performed by the player according to a personal selection made by the end user (e.g., according to a video screen zoom prompt in a user interface of the player), or a zoom operation automatically performed by the player according to an authoring intention of the video content source provider (e.g., director's recommendation).

The sphere region is configured for determining a zoom range of the omnidirectional video in the spherical coordinate system, and usually corresponds to a spherical position of the current user viewport, but other spherical positions may exist.

Information on the sphere region includes one or more of: a center point of the sphere region, an azimuth angle range and an elevation angle range of the sphere region.

The center point of sphere region includes: an azimuth angle at the center point, an elevation angle at the center point and a tilt angle at the center point. One or more sphere regions may exist during the above zoom operation.

At step 1906: in the playing process, the terminal determines, for the omnidirectional video file after local decapsulation, whether video data of the zoom region corresponding to the zoom operation on the sphere region of the omnidirectional video exists in the video file. If video data of the zoom region exists, step 1910 is executed; otherwise, step 1907 is performed.

Here, the terminal determines, based on elements in the video track sample entry, a sphere region of an omnidirectional video, and one or more zoom regions of the sphere region on a projected picture of the omnidirectional video; and thus judges whether video data of a zoom region corresponding to the zoom operation on the sphere region exists.

For example, if there is a sphere region zooming box or coverage information box in the video track sample entry and the information on the sphere region in the box matches the information on the sphere region in the zoom operation of step 1905, it is determined that there is video data of the zoom region corresponding to the zoom operation on the sphere region.

There may be one or more of said video data of the zoom region, each corresponding to video data of a different zoom ratio (resolution or quality) of the sphere region on the projected picture of the omnidirectional video.

At step 1907: the terminal (streaming media client) judges whether an SRWZ descriptor corresponding to the sphere region in the zoom operation exists in the MPD file. If so, step 1908 is executed; otherwise, step 1911 is performed.

Here, the terminal identifies the SRWZ descriptor based on the URI attribute value in the MPD file, and determines whether the descriptor corresponds to the sphere region in the zoom operation by retrieving a subelement sphRegionInfo (sphere region information) in the SWRZ descriptor.

At step 1908: the terminal (streaming media client) requests an omnidirectional video file corresponding to the zoom operation on the sphere region according to the SRWZ descriptor in the MPD file corresponding to the sphere region in the zoom operation.

In this step, the URL address of the video segment carried in the request (e.g., an HTTP GET message) for a video segment sent from the client to the server is a URL address of the representation indicated by the SRW descriptor.

The video track corresponding to the representation includes video data of a projection region of the sphere region on a projected picture of the omnidirectional video, and video data of one or more zoom regions of the sphere region on the projected picture of the omnidirectional video.

At step 1909: the server returns the video segment (e.g., an HTTP 200 response message) to the client.

Here, the video segment includes video data of a projection region of the sphere region on a projected picture of the omnidirectional video, and video data of one or more zoom regions of the sphere region on the projected picture of the omnidirectional video.

At step 1910: the terminal (video player) decodes and plays the video data of one or more zoom regions corresponding to the sphere region in the zoom operation, and continues to execute step 1905 until the player exits the zoom operation.

In some examples, the terminal decodes and plays the video data of the one or more zoom region corresponding to the zoom operation on the sphere region according to one or more of the following zoom region information: the number of zoom regions; width, height, vertical offset and horizontal offset of the zoom region; a zoom ratio of the zoom region; a zoom algorithm type of the zoom region; a boundary symbolization type of the zoom region; a type of spherical zoom region; and text description of the zoom region.

At step 1911: the terminal requests, according to a zoom ratio of the sphere region in the zoom operation, an omnidirectional video file corresponding to the zoom ratio.

Here, the client sends a request (such as an HTTP GET message) for obtaining a video segment to the server, where the request carries a URL address of the video segment at a corresponding bitrate.

In general, the terminal requests, corresponding to an enlargement operation on the sphere region (and the higher the ratio), a video file version with a high bitrate (the higher the bitrate); and requests, corresponding to a contraction operation on the sphere region (and the higher the ratio), a video file version with a low bitrate (the lower the bitrate).

At step 1912: after receiving the request, the server returns the video segment (e.g., an HTTP 200 response message) to the client, where the video segment includes video data corresponding to the zoom ratio of the sphere region in the zoom operation.

At step 1913: after receiving the file, the terminal decodes and plays the video data corresponding to the zoom ratio of the sphere region in the zoom operation, and turns to execute step 1905 until the player exits the zoom operation.

Figure 20:
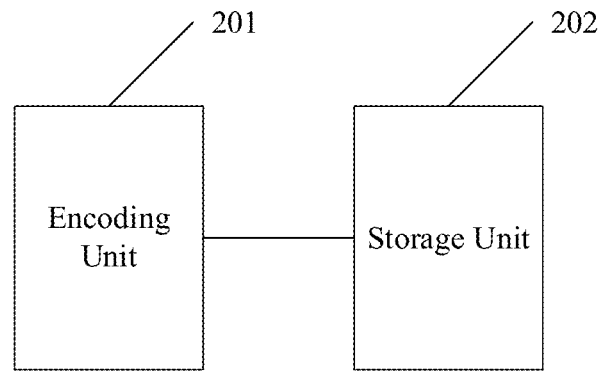
FIG. 20 is a schematic structural diagram of a video data processing device provided on a server according to an embodiment of the disclosure.

In order to implement the method in the embodiments of the present disclosure, an embodiment of the disclosure further provides a video data processing device disposed on a server. As shown in FIG. 20, the device includes: an encoding unit 201 and a storage unit 202.

In an embodiment, the encoding unit 201 is configured to: determine a sphere region of an omnidirectional video, encode and generate video data of a projection region of the sphere region on a projected picture of the omnidirectional video, and video data of one or more zoom regions of the sphere region on the projected picture of the omnidirectional video; and the storage unit 202 is configured to store the encoded video data, information on the sphere region of the omnidirectional video, and information on the one or more zoom regions of the sphere region on the projected picture of the omnidirectional video.

In some examples, the encoding unit 201 may be further configured to: generating, for a plurality of omnidirectional video bit streams of the same content source, video data of different zoom regions of the sphere region on the projected picture of the omnidirectional video according to an MCTS mode with different resolutions or qualities.

Further, the storage unit 202 is configured to: store the video data of the projection region of the sphere region on the projected picture of the omnidirectional video and the video data of the one or more zoom regions in the same video track or the same video file.

In some examples, the storage unit 202 may be further configured to: store, in a sphere region zooming box or coverage information box in a video track sample entry, information on the sphere region of the omnidirectional video, and information on the one or more zoom regions of the sphere region on the projected picture of the omnidirectional video.

In another embodiment, the encoding unit 201 is configured to: determine a 2D region on a projected picture of an omnidirectional video, encode and generate video data of the 2D region, and video data of one or more zoom regions of the 2D region on the projected picture of the omnidirectional video; and the storage unit 202 is configured to store the encoded video data, information on the 2D region on the projected picture of the omnidirectional video, and information on the one or more zoom regions of the 2D region on the projected picture of the omnidirectional video.

In some examples, the encoding unit 201 may be further configured to: generate, for a plurality of omnidirectional video bit streams of the same content source, video data of different zoom regions of the 2D region on the projected picture of the omnidirectional video according to an MCTS mode with different resolutions or qualities.

Further, the storage unit 202 is configured to: store the video data of the 2D region, and the video data of the one or more zoom regions of the 2D region on the projected picture of the omnidirectional video in the same video track or the same video file.

In some examples, the storage unit 202 may be further configured to: store, in a 2D region zooming box or region wise packing box in a video track sample entry, information on the 2D region on the projected picture of the omnidirectional video, and information on the one or more zoom regions of the 2D region on the projected picture of the omnidirectional video.

In practical applications, the encoding unit 201 may be implemented by a processor in a video data processing device; and the storage unit 202 may be implemented by a processor in a video data processing device in combination with a communication interface.

Figure 21:
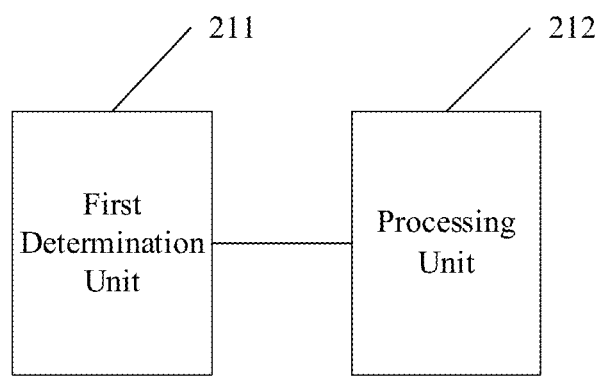
FIG. 21 is a schematic structural diagram of a video data processing device provided on a terminal according to an embodiment of the disclosure.

In order to implement the method in the embodiments of the present disclosure, an embodiment of the disclosure further provides a video data processing device disposed on a terminal. As shown in FIG. 21, the device includes: a first determination unit 211 and a processing unit 212.

In an embodiment, the first determination unit 211 is configured to determine a sphere region of an omnidirectional video, and one or more zoom regions of the sphere region on a projected picture of the omnidirectional video; and the processing unit 212 is configured to decode and play video data of the one or more zoom regions of the sphere region on the projected picture of the omnidirectional video, in response to a zoom operation on the sphere region of the omnidirectional video.

In some examples, the first determination unit 211 may be further configured to: determine, based on the elements in the video track sample entry, a sphere region of an omnidirectional video, and one or more zoom regions of the sphere region on a projected picture of the omnidirectional video.

In another embodiment, the first determination unit 211 is configured to determine a 2D region on a projected picture of an omnidirectional video, and one or more zoom regions of the 2D region on the projected picture of the omnidirectional video; and the processing unit 212 is configured to decode and play video data of one or more zoom regions of the 2D region on the projected picture of the omnidirectional video corresponding to a zoom operation on the 2D region on the projected picture of the omnidirectional video.

In some examples, the first determination unit 211 may be further configured to: determine, based on elements in the video track sample entry, a 2D region on a projected picture of an omnidirectional video, and one or more zoom regions of the 2D region on the projected picture of the omnidirectional video.

In practical applications, the first determination unit 211 and the processing unit 212 may be implemented by a processor in a video data processing device.

Figure 22:
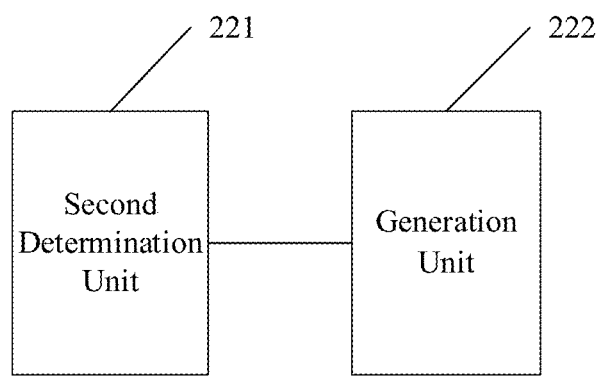
FIG. 22 is a schematic structural diagram of another video data processing device provided on a server according to an embodiment of the disclosure.

In order to implement the method in the embodiments of the present disclosure, an embodiment of the disclosure further provides a video data processing device disposed on a server. As shown in FIG. 22, the device includes: a second determination unit 221 and a generation unit 222.

The second determination unit 221 is configured to determine a sphere region of an omnidirectional video, and one or more zoom regions of the sphere region on a projected picture of the omnidirectional video; and the generation unit 222 is configured to generate a media presentation description file of the omnidirectional video, the media presentation description file including a sphere region zoom descriptor indicating a sphere region of the omnidirectional video and one or more zoom regions of the sphere region on the projected picture of the omnidirectional video.

Alternatively, the second determining unit 221 is configured to determine a 2D region on a projected picture of an omnidirectional video, and one or more zoom regions of the 2D region on the projected picture of the omnidirectional video; and the generation unit 222 is configured to generate a media presentation description file of the omnidirectional video, the media presentation description file including a 2D region zoom descriptor indicating a 2D region on the projected picture of the omnidirectional video and one or more zoom regions of the 2D region on the projected picture of the omnidirectional video.

In practical applications, the second determination unit 221 and the generation unit 222 may be implemented by a processor in a video data processing device.

Figure 23:
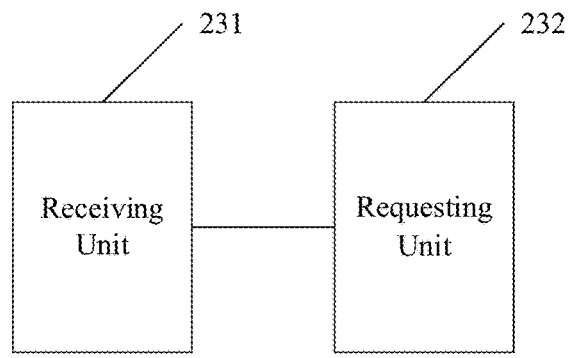
FIG. 23 is a schematic structural diagram of another video data processing device provided on a terminal according to an embodiment of the disclosure.

In order to implement the method in the embodiments of the present disclosure, an embodiment of the disclosure further provides a video data processing device disposed on a terminal. As shown in FIG. 23, the device includes: a receiving unit 231 and a requesting unit 232.

The receiving unit 231 is configured to receive a media presentation description file, where the media presentation description file includes a sphere region zoom descriptor indicating a sphere region of an omnidirectional video and one or more zoom regions of the sphere region on the projected picture of the omnidirectional video; and the requesting unit 232 is configured to request to obtain, according to the sphere region zoom descriptor, an omnidirectional video file corresponding to a first zoom operation on the sphere region of the omnidirectional video.

Alternatively, the receiving unit 231 is configured to receive a media presentation description file, where the media presentation description file includes a 2D region zoom descriptor indicating a 2D region on a projected picture of an omnidirectional video and one or more zoom regions of the 2D region on the projected picture of the omnidirectional video; and the requesting unit 232 is configured to request to obtain, according to the 2D region zoom descriptor, an omnidirectional video file corresponding to a third zoom operation on the 2D region on the projected picture of the omnidirectional video.

In an embodiment, the requesting unit 232 is configured to: identify the sphere region zoom descriptor according to the URI attribute designated in the media presentation description file; or identify the 2D region zoom descriptor according to the URI attribute designated in the media presentation description file.

In an embodiment, the requesting unit 232 is configured to: request to obtain a first omnidirectional video file corresponding to a first zoom operation on the sphere region of the omnidirectional video; determine a second zoom operation on a sphere region of the omnidirectional video, the second zoom operation corresponding to a second sphere region different from a first sphere region corresponding to the first zoom operation; and request to obtain, according to the sphere region zoom descriptor, a second omnidirectional video file corresponding to the second zoom operation.

Alternatively, the requesting unit 232 is configured to: request to obtain a third omnidirectional video file corresponding to a third zoom operation on the 2D region on the projected picture of the omnidirectional video; determine a fourth zoom operation on the 2D region on the projected picture of the omnidirectional video, the fourth zoom operation corresponding to a first 2D region different from a second 2D region corresponding to the third zoom operation; and request to obtain, according to the 2D region zoom descriptor, a fourth omnidirectional video file corresponding to the fourth zoom operation.

In practical applications, the receiving unit 231 may be implemented by a communication interface in a video data processing device; and the requesting unit 232 may be implemented by a processor in a video data processing device in combination with a communication interface.

It should be noted that: when processing video data, the video data processing device provided in the above embodiments is merely illustrated by dividing the program modules in an exemplary manner, and in practical applications, the processing may be allocated to and completed by different program modules as needed, that is, the internal structure of the device may be divided into different program modules to complete all or part of the above-described processing. In addition, the video data processing device and the video data processing method provided in the foregoing embodiments belong to the same concept, and specific implementation processes thereof are described in detail in the method embodiments and thus are not repeated here.

Figure 24:
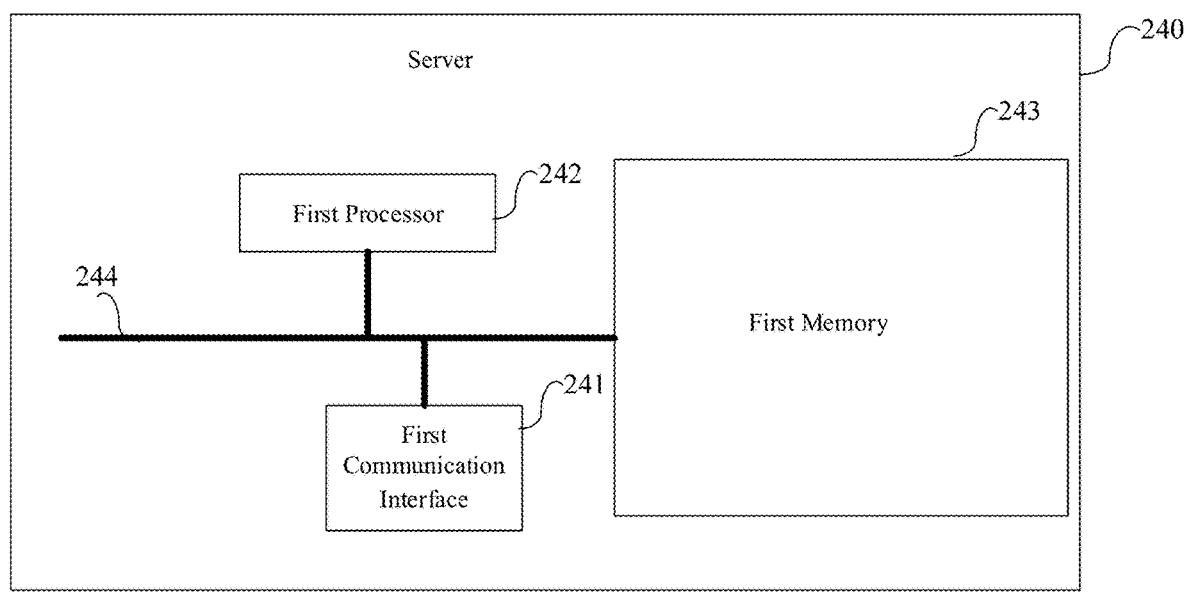
FIG. 24 is a schematic structural diagram of a server according to an embodiment of the disclosure.

Based on the hardware implementation of the foregoing program modules, and in order to implement the method at the server side in the embodiments of the present disclosure, an embodiment of the disclosure further provides a server. As shown in FIG. 24, the server 240 includes: a first communication interface 241 capable of performing information interaction with other apparatuses; and a first processor 242 connected to the first communication interface 241 for implementing information interaction with other apparatuses, and, when running a computer program, executing the method provided in one or more of the above technical solutions at the server side. The computer program is stored on a first memory 243.

In practical applications, obviously, the various components in the server 240 are coupled together by a bus system 244. It is understood that the bus system 244 is configured to enable communications among these components. The bus system 244 includes, in addition to a data bus, a power bus, a control bus, and a status signal bus. However, for clarity of illustration, the various busses are shown jointly in FIG. 24 as the bus system 244.

The first memory 243 in the embodiment of the present disclosure is configured to store various types of data to support operations on a smart apparatus 80. Examples of such data include: any computer program to be operated on the server 240.

The method disclosed in the embodiments of the disclosure can be applied into or implemented by the first processor 242. The first processor 242 may be an integrated circuit chip capable of processing signals. In implementation, the steps of the above method may be implemented by an integrated logic circuit in hardware or instructions in the form of software in the first processor 242. The first processor 242 may be a general-purpose processor, a digital signal processor (DSP), or other programmable logic devices, discrete gate or transistor logic devices, discrete hardware components, or the like. The first processor 242 may implement or perform the methods, steps, and logic blocks disclosed in the embodiments of the present disclosure. The general-purpose processor may be a microprocessor or any conventional processor or the like. The steps of the method disclosed in the embodiments of the present disclosure may be directly implemented by a hardware decoding processor, or implemented by a combination of hardware and software modules in the decoding processor. The software module may be located in a storage medium in the first memory 243, and the first processor 242 reads information from the first memory 243 and completes the steps of the above methods in combination with hardware thereof.

In an exemplary embodiment, the server 240 may be implemented by one or more application specific integrated circuits (ASICs), DSPs, programmable logic devices (PLDs), complex programmable logic devices (CPLDs), field-programmable gate arrays (FPGAs), general-purpose processors, controllers, micro controllers (MCUs), microprocessors, or other electronic components for performing the aforementioned methods.

Figure 25:
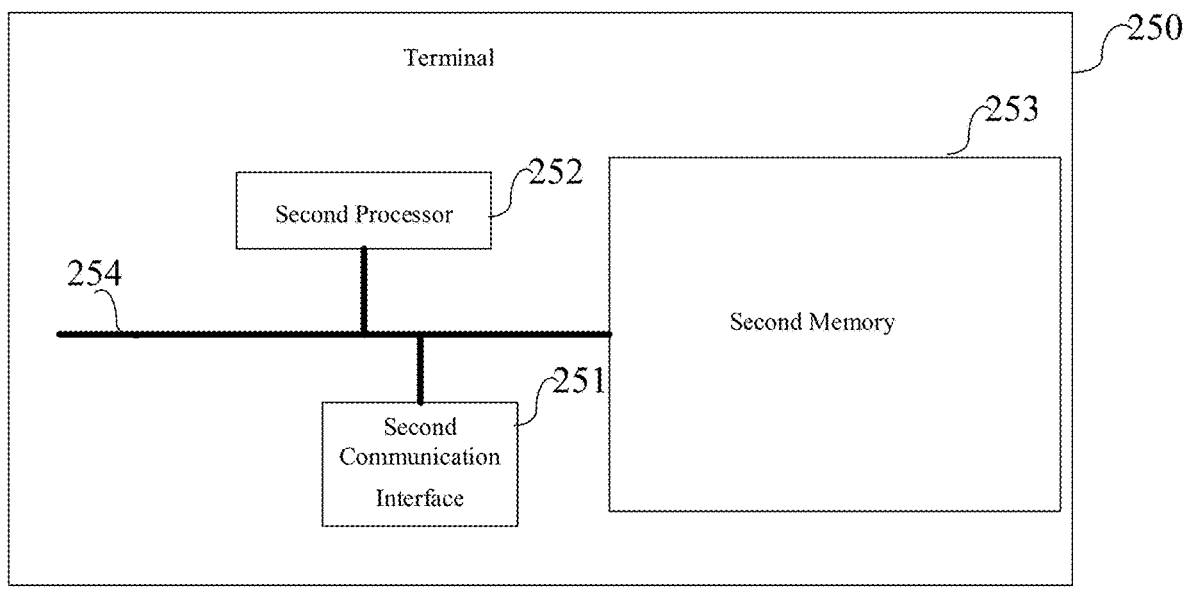
FIG. 25 is a schematic structural diagram of a terminal according to an embodiment of the disclosure.

Based on the hardware implementation of the foregoing program modules, and in order to implement the method provided in the embodiments of the disclosure at the terminal side, as shown in FIG. 25, a terminal 250 includes a second communication interface 251 and a second processor 252.

The second communication interface 251 is capable of performing information interaction with a network.

The second processor 252 is connected to the second communication interface 251 for implementing information interaction with the network, and is configured to, when running a computer program, execute the method provided in one or more of the above technical solutions at the terminal side. The computer program is stored on a second memory 253.

In practical applications, obviously, the various components in the terminal 250 are coupled together by a bus system 254. It is understood that the bus system 254 is configured to enable communications among these components. The bus system 254 includes, in addition to a data bus, a power bus, a control bus, and a status signal bus. However, for clarity of illustration, the various busses are shown jointly in FIG. 25 as the bus system 254.

The second memory 253 in the embodiment of the present disclosure is configured to store various types of data to support operations on a smart terminal 250. Examples of such data include: any computer program to be operated on the terminal 250.

The method disclosed in the embodiments of the disclosure can be applied into or implemented by the second processor 252. The second processor 252 may be an integrated circuit chip capable of processing signals. In implementation, the steps of the above method may be implemented by an integrated logic circuit in hardware or instructions in the form of software in the second processor 252. The second processor 252 may be a general-purpose processor, a DSP, or other programmable logic devices, discrete gate or transistor logic devices, discrete hardware components, or the like. The second processor 252 may implement or perform the methods, steps, and logic blocks disclosed in the embodiments of the present disclosure. The general-purpose processor may be a microprocessor or any conventional processor or the like. The steps of the method disclosed in the embodiments of the present disclosure may be directly implemented by a hardware decoding processor, or implemented by a combination of hardware and software modules in the decoding processor. The software module may be located in a storage medium in the second memory 253, and the second processor 252 reads information from the second memory 253 and completes the steps of the above methods in combination with hardware thereof.

In an exemplary embodiment, the terminal 250 may be implemented by one or more ASICs, DSPs, PLDs, CPLDs, FPGAs, general-purpose processors, controllers, MCUs, microprocessors, or other electronic components for performing the foregoing methods.

It will be appreciated that the memories (the first memory 243 and the second memory 253) in the embodiments of the present disclosure may include either a volatile memory or a nonvolatile memory, or both. The nonvolatile memory may be a read only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, an optical disk, or a compact disc read-only memory (CD-ROM); where the magnetic surface memory may be a disk or tape memory. The volatile memory may be a random access memory (RAM) used as an external cache. By way of example but not limitation, many forms of RAMs are available, such as a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synclink dynamic random access memory (SLDRAM), and a direct rambus random access memory (DRRAM). The memories described in the embodiments of this disclosure are intended to include, but not limited to, these and any other suitable types of memories.

Figure 26:
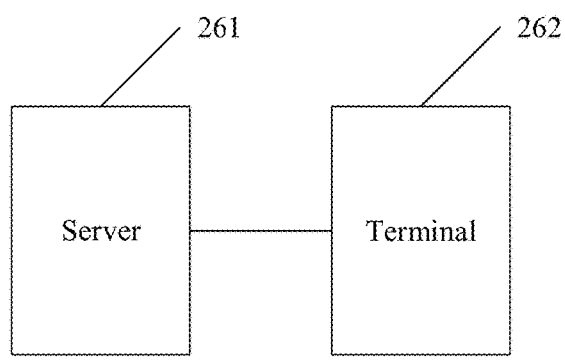
FIG. 26 is a schematic structural diagram of a video data processing system according to an embodiment of the disclosure.

In order to implement the method in the embodiments of the present disclosure, an embodiment of the disclosure further provides a video data processing system. As shown in FIG. 26, the system includes: a server 261 and a terminal 262.

In practical applications, as shown in FIG. 13, the system may further include: a streaming media server responsible for storing data of the server 261 and relevant information on the zoom region for the terminal 262 to obtain.

It should be noted that: the specific processing procedures of the server 261 and the terminal 262 have been described in detail above, and thus are not repeated here.

In an exemplary embodiment, an embodiment of the present disclosure further provides a storage medium, i.e., a computer storage medium, which may be specifically a computer-readable storage medium. In an example, the storage medium is the first memory 243 storing a computer program executable by the first processor 242 of the server 240 to complete steps of the method at the server side described above. In another example, the storage medium is the second memory 253 storing a computer program executable by the second processor 252 of the terminal 250 to complete steps of the method at the terminal side described above. The computer-readable storage medium may be memories such as FRAMs, ROMs, PROMs, EPROMs, EEPROMs, a flash memory, a magnetic surface memory, an optical disk, or CD-ROM.

The above are only preferred embodiments of the present disclosure and not intended to limit the scope of the present disclosure.

What is claimed is:

1. A video data processing method applied to a server, the method comprising:
    determining a sphere region of an omnidirectional video, encoding and generating video data of a projection region of the sphere region on a projected picture of the omnidirectional video, and video data of one or more zoom regions of the sphere region on the projected picture of the omnidirectional video; and storing the encoded video data, information on the sphere region of the omnidirectional video, and information on the one or more zoom regions of the sphere region on the projected picture of the omnidirectional video, wherein the video data of the one or more zoom regions of the sphere region on the projected picture of the omnidirectional video is video data in different resolution or different quality of the video data of the projection region of the sphere region on the projected picture of the omnidirectional video, and wherein the storing the encoded video data comprises: storing the video data of the projection region of the sphere region on the projected picture of the omnidirectional video and the video data of the one or more zoom regions of the sphere region on the projected picture of the omnidirectional video in a same video track or a same video file, or
    determining a two-dimensional (2D) region on a projected picture of an omnidirectional video, encoding and generating video data of the 2D region, and video data of one or more zoom regions of the 2D region on the projected picture of the omnidirectional video; and storing the encoded video data, information on the 2D region on the projected picture of the omnidirectional video, and information on the one or more zoom regions of the 2D region on the projected picture of the omnidirectional video, wherein the video data of the one or more zoom regions of the 2D region on the projected picture of the omnidirectional video is video data in different resolution or different quality of the video data of the 2D region, and wherein the storing the encoded video data comprises: storing the video data of the 2D region, and the video data of the one or more zoom regions of the 2D region on the projected picture of the omnidirectional video in a same video track or a same video file.

2. The method according to claim 1, wherein the step of storing the information on the sphere region of the omnidirectional video, and the information on the one or more zoom regions of the sphere region on the projected picture of the omnidirectional video comprises:
    storing, in a sphere region zooming box or coverage information box in a video track sample entry, the information on the sphere region of the omnidirectional video, and the information on the one or more zoom regions of the sphere region on the projected picture of the omnidirectional video, or wherein the step of storing the information on the 2D region on the projected picture of the omnidirectional video, and the information on the one or more zoom regions of the 2D region on the projected picture of the omnidirectional video comprises:

storing, in a 2D region zooming box or a region wise packing box in a video track sample entry, the information on the 2D region on the projected picture of the omnidirectional video, and the information on the one or more zoom regions of the 2D region on the projected picture of the omnidirectional video.

3. A video data processing method applied to a terminal, the method comprising:

determining a sphere region of an omnidirectional video, and one or more zoom regions of the sphere region on a projected picture of the omnidirectional video; and decoding and playing video data of the one or more zoom regions of the sphere region on the projected picture of the omnidirectional video, in response to a zoom operation on the sphere region of the omnidirectional video, wherein the video data of the one or more zoom regions of the sphere region on the projected picture of the omnidirectional video is video data in different resolution or different quality of video data of the projection region of the sphere region on the projected picture of the omnidirectional video, and wherein the video data of the projection region of the sphere region on the projected picture of the omnidirectional video and the video data of the one or more zoom regions of the sphere region on the projected picture of the omnidirectional video are stored in a same video track or a same video file.

4. The method according to claim 3, wherein the step of determining the sphere region of the omnidirectional video, and the one or more zoom regions of the sphere region on the projected picture of the omnidirectional video comprises:

determining, based on an element in a video track sample entry, the sphere region of the omnidirectional video, and the one or more zoom regions of the sphere region on the projected picture of the omnidirectional video.

5. The method according to claim 4, wherein the step of determining, based on the element in the video track sample entry, the sphere region of the omnidirectional video, and the one or more zoom regions of the sphere region on the projected picture of the omnidirectional video comprises:

determining, based on a sphere region zooming box or coverage information box in the video track sample entry, the sphere region of the omnidirectional video, and the one or more zoom regions of the sphere region on the projected picture of the omnidirectional video.

6. The method according to claim 5, further comprising:

determining, based on a designated value of a region zoom indicator element in the sphere region zooming box or coverage information box, that the one or more zoom regions of the sphere region are present on the projected picture of the omnidirectional video.

7. The method according to claim 4, wherein information on the one or more zoom regions in the element comprises at least one of:

a number of the one or more zoom regions;

width, height, vertical offset and horizontal offset of the one or more zoom regions;

a zoom ratio of the one or more zoom regions;

a zoom algorithm type of the one or more zoom regions;

a boundary symbolization type of the one or more zoom regions;

a type of the one or more zoom regions; and text description of the one or more zoom regions.

8. A video data processing method applied to a terminal, the method comprising:

determining a 2D region on a projected picture of an omnidirectional video, and one or more zoom regions of the 2D region on the projected picture of the omnidirectional video; and decoding and playing video data of the one or more zoom regions of the 2D region on the projected picture of the omnidirectional video, in response to a zoom operation on the 2D region on the projected picture of the omnidirectional video, wherein the video data of the one or more zoom regions of the 2D region on the projected picture of the omnidirectional video is video data in different resolution or different quality of video data of the 2D region, and wherein the video data of the 2D region, and the video data of the one or more zoom regions of the 2D region on the projected picture of the omnidirectional video are stored in a same video track or a same video file.

9. The method according to claim 8, wherein the step of determining the 2D region on the projected picture of the omnidirectional video, and the one or more zoom regions of the 2D region on the projected picture of the omnidirectional video comprises:

determining, based on an element in a video track sample entry, the 2D region on the projected picture of the omnidirectional video, and the one or more zoom regions of the 2D region on the projected picture of the omnidirectional video.

10. The method according to claim 9, wherein the step of determining, based on the element in the video track sample entry, the 2D region on the projected picture of the omnidirectional video, and the one or more zoom regions of the 2D region on the projected picture of the omnidirectional video comprises:

determining, based on a 2D region zooming box or region wise packing box in the video track sample entry, the 2D region on the projected picture of the omnidirectional video, and the one or more zoom regions of the 2D region on the projected picture of the omnidirectional video.

11. The method according to claim 10, further comprising:

determining, based on a designated value of a region zoom indicator element in the 2D region zooming box or region wise packing box, that the one or more zoom regions of the 2D region are present on the projected picture of the omnidirectional video.

12. The method according to claim 9, wherein information on the one or more zoom regions in the element comprises at least one of:

a number of the one or more zoom regions;

width, height, vertical offset and horizontal offset of the one or more zoom regions;

a zoom ratio of the one or more zoom regions;

a zoom algorithm type of the one or more zoom regions;

a boundary symbolization type of the one or more zoom regions;

a type of the one or more zoom regions; and text description of the one or more zoom regions.

13. A video data processing method applied to a terminal, the method comprising:
- receiving a media presentation description file, wherein the media presentation description file comprises a sphere region zoom descriptor or a 2D region zoom descriptor, wherein the sphere region zoom descriptor is used for indicating a sphere region of an omnidirectional video and one or more zoom regions of the sphere region on a projected picture of the omnidirectional video, and the 2D region zoom descriptor is used for indicating a 2D region on a projected picture of an omnidirectional video and one or more zoom regions of the 2D region on the projected picture of the omnidirectional video; and
- in a case where the media presentation description file comprises the sphere region zoom descriptor, requesting to obtain, according to the sphere region zoom descriptor, an omnidirectional video file corresponding to a zoom operation on the sphere region of the omnidirectional video, wherein the omnidirectional video file comprises video data of a projection region of the sphere region on the projected picture of the omnidirectional video, and video data of the one or more zoom regions of the sphere region on the projected picture of the omnidirectional video, wherein the video data of the one or more zoom regions of the sphere region on the projected picture of the omnidirectional video is video data in different resolution or different quality of the video data of the projection region of the sphere region on the projected picture of the omnidirectional video, and wherein the video data of the projection region of the sphere region on the projected picture of the omnidirectional video and the video data of the one or more zoom regions of the sphere region on the projected picture of the omnidirectional video are stored in a same video track or a same video file, or
- in a case where the media presentation description file comprises the 2D region zoom descriptor, requesting to obtain, according to the 2D region zoom descriptor, an omnidirectional video file corresponding to a zoom operation on the 2D region on the projected picture of the omnidirectional video, wherein the omnidirectional video file comprises video data of the 2D region, and video data of the one or more zoom regions of the 2D region on the projected picture of the omnidirectional video, wherein the video data of the one or more zoom regions of the 2D region on the projected picture of the omnidirectional video is video data in different resolution or different quality of the video data of the 2D region, and wherein the video data of the 2D region, and the video data of the one or more zoom regions of the 2D region on the projected picture of the omnidirectional video are stored in a same video track or a same video file.

14. The method according to claim 13, further comprising:
- in a case where the media presentation description file comprises the sphere region zoom descriptor, identifying the sphere region zoom descriptor according to a Uniform Resource Identifier (URI) attribute designated in the media presentation description file, or
- in a case where the media presentation description file comprises the 2D region zoom descriptor, identifying the 2D region zoom descriptor according to a URI attribute designated in the media presentation description file.

15. The method according to claim 13, wherein the step of in a case where the media presentation description file comprises the sphere region zoom descriptor, requesting to obtain the omnidirectional video file corresponding to the zoom operation on the sphere region of the omnidirectional video comprises:
- requesting to obtain a first omnidirectional video file corresponding to a first zoom operation on a sphere region of the omnidirectional video; and
- determining a second zoom operation on a sphere region of the omnidirectional video, the second zoom operation corresponding to a second sphere region different from a first sphere region corresponding to the first zoom operation; and requesting to obtain, according to the sphere region zoom descriptor, a second omnidirectional video file corresponding to the second zoom operation, or
- in a case where the media presentation description file comprises the 2D region zoom descriptor, the step of requesting to obtain the omnidirectional video file corresponding to the zoom operation on the 2D region on the projected picture of the omnidirectional video comprises:
- requesting to obtain a third omnidirectional video file corresponding to a third zoom operation on a 2D region on the projected picture of the omnidirectional video; and
- determining a fourth zoom operation on a 2D region on the projected picture of the omnidirectional video, the fourth zoom operation corresponding to a first 2D region different from a second 2D region corresponding to the third zoom operation; and requesting to obtain, according to the 2D region zoom descriptor, a fourth omnidirectional video file corresponding to the fourth zoom operation.

16. The method according to claim 13, wherein the sphere region zoom descriptor or the 2D region zoom descriptor contains at least one of:
- a number of the one or more zoom regions;
- width, height, vertical offset and horizontal offset of the one or more zoom regions;
- a zoom ratio of the one or more zoom regions;
- a zoom algorithm type of the one or more zoom regions;
- a boundary symbolization type of the one or more zoom regions;
- a type of the one or more zoom regions; and
- text description of the one or more zoom regions.

17. A video data processing device, comprising a processor, and a memory having a program stored therein which, when executed by the processor, causes the processor to implement the method of claim 3.

18. A video data processing device, comprising a processor, and a memory having a program stored therein which, when executed by the processor, causes the processor to implement the method of claim 8.

19. A video data processing device, comprising a processor, and a memory having a program stored therein which, when executed by the processor, causes the processor to implement the method of claim 13.

* * * * *